United States Patent
Tamura et al.

(10) Patent No.: US 10,924,048 B2
(45) Date of Patent: Feb. 16, 2021

(54) INVERTER CONTROL DEVICE, MOTOR DRIVE DEVICE, AND ELECTRIC POWER STEERING APPARATUS

(71) Applicant: HITACHI AUTOMOTIVE SYSTEMS, LTD., Hitachinaka (JP)

(72) Inventors: Hiroshi Tamura, Tokyo (JP); Hiroshi Aoyagi, Hitachinaka (JP); Tomishige Yatsugi, Hitachinaka (JP); Shigehisa Aoyagi, Tokyo (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 384 days.

(21) Appl. No.: 16/068,062

(22) PCT Filed: Nov. 22, 2016

(86) PCT No.: PCT/JP2016/084619
§ 371 (c)(1),
(2) Date: Jul. 3, 2018

(87) PCT Pub. No.: WO2017/119201
PCT Pub. Date: Jul. 13, 2017

(65) Prior Publication Data
US 2020/0280278 A1    Sep. 3, 2020

(30) Foreign Application Priority Data
Jan. 5, 2016  (JP) .................... 2016-000328

(51) Int. Cl.
*H02P 21/22* (2016.01)
*H02P 25/22* (2006.01)
(Continued)

(52) U.S. Cl.
CPC ............ *H02P 21/22* (2016.02); *B62D 5/0475* (2013.01); *H02P 25/22* (2013.01); *H02P 27/12* (2013.01); *H02P 29/028* (2013.01)

(58) Field of Classification Search
USPC ........................................... 318/560
See application file for complete search history.

(56) References Cited

U.S. PATENT DOCUMENTS 6,053,842 A * 4/2000 Kitada .................. B60K 6/543
                                                477/5
6,456,033 B1 * 9/2002 Nishimura ............. H02K 17/14
                                                318/772
(Continued)

FOREIGN PATENT DOCUMENTS

CN         102916643 A    2/2013
JP        2006-158182 A   6/2006
(Continued)

OTHER PUBLICATIONS

International Search Report with English translation and Written Opinion issued in corresponding application No. PCT/JP2016/084619 dated Feb. 7, 2017.

*Primary Examiner* — Bentsu Ro
(74) *Attorney, Agent, or Firm* — Foley & Lardner LLP

(57) ABSTRACT

An inverter control device including at least first and second inverters includes: a current detector that detects a current flowing through a main circuit of the first inverter; a current controller that generates a voltage command value of the first inverter on the basis of a detected current and a current command; and a voltage command predictor that generates a voltage command value of the second inverter on the basis of a variation of the voltage command value of the first inverter.

11 Claims, 25 Drawing Sheets

(51) Int. Cl.
*B62D 5/04* (2006.01)
*H02P 27/12* (2006.01)
*H02P 29/028* (2016.01)

(56) References Cited

U.S. PATENT DOCUMENTS

| | | | |
|---|---|---|---|
| 2007/0289794 A1* | 12/2007 | Ishikawa | B60L 53/22 |
| | | | 180/165 |
| 2009/0159348 A1* | 6/2009 | Oyobe | H02M 7/48 |
| | | | 180/65.21 |
| 2009/0255744 A1* | 10/2009 | Kitano | B60W 10/06 |
| | | | 180/65.285 |
| 2011/0074333 A1 | 3/2011 | Suzuki | |
| 2013/0033210 A1 | 2/2013 | Suzuki et al. | |
| 2013/0241452 A1 | 9/2013 | Suzuki | |
| 2015/0210267 A1* | 7/2015 | Sato | B60L 50/61 |
| | | | 701/22 |
| 2017/0302216 A1* | 10/2017 | Ide | B60L 3/003 |
| 2018/0257640 A1* | 9/2018 | Takayama | B60W 10/115 |
| 2018/0297601 A1* | 10/2018 | Fukaya | B60L 3/0061 |

FOREIGN PATENT DOCUMENTS

| | | |
|---|---|---|
| JP | 2009-033938 A | 2/2009 |
| JP | 2011-078230 A | 4/2011 |
| JP | 2011-244577 A | 12/2011 |
| JP | 2012-076644 A | 4/2012 |
| JP | 2014-007880 A | 1/2014 |
| JP | 2014-236589 A | 12/2014 |

* cited by examiner

INVERTER CONTROL DEVICE, MOTOR DRIVE DEVICE, AND ELECTRIC POWER STEERING APPARATUS

TECHNICAL FIELD

The present invention relates to an inverter control device mounted on a vehicle, and more particularly, to a method of reducing a computation load of a control device for controlling inverters and motors of a plurality of channels.

BACKGROUND ART

In recent years, development of autonomous vehicles has been rapidly advanced, and functional safety standards required for electric parts are increasing. For example, in an inverter control device used in an electric power steering apparatus for an autonomous vehicle, a technique for securing safety by duplicating the system is known in the art.

JP 2012-76644 A (PTL 1) discloses a technique for adding a current detection value of a first inverter and a current detection value of a second inverter and generating a voltage command on the basis of the added current detection value and a current command value.

CITATION LIST

Patent Literature

PTL 1: JP 2012-076644 A

SUMMARY OF INVENTION

Technical Problem

In the method discussed in PTL 1, it is necessary to detect the current values as many as the number of channels included in the system. In the case of a system that detects a DC bus current of the inverter or a current flowing between a lower or upper arm of each phase of the inverter and a DC bus (hereinafter, referred to as a "three-shunt current"), it is necessary to add a process of calculating a three-phase AC current flowing to a motor coil on the basis of the detected DC bus current or three-shunt current and a process of transforming the calculated three-phase AC current to a dq-axis current as many as the number of channels included in the system. In addition, in the case of a system that detects a three-phase AC current flowing to the motor coil, it is necessary to add a process of transforming the detected three-phase AC current to the dq-axis current as many as the number of channels included in the system.

In this manner, in the method discussed in PTL 1, it is difficult to reduce a computation load in a control device for a system including inverters and motors of a plurality of channels. In this regard, an object of the present invention is to reduce a computation load of the control device without reducing responsiveness of the current control (torque control).

Solution to Problem

According to an aspect of the present invention, an inverter control device including at least first and second inverters includes: a current detector that detects a current flowing through a main circuit of the first inverter; a current controller that generates a voltage command value of the first inverter on the basis of a detected current and a current command; and a voltage command predictor that generates a voltage command value of the second inverter on the basis of a variation of the voltage command value of the first inverter.

Advantageous Effects of Invention

Since the present invention has the aforementioned configurations, it is possible to reduce a computation load of the control device without reducing responsiveness of the current control (torque control).

BRIEF DESCRIPTION OF DRAWINGS

FIG. 4 (b) is a diagram illustrating a current path under a switch mode 2 of FIG. 3.

FIG. 4 (c) is a diagram illustrating a current path under a switch mode 3 of FIG. 3.

FIG. 4 (d) is a diagram illustrating a current path under a switch mode 4 of FIG. 3.

DESCRIPTION OF EMBODIMENTS

Figure 1A:
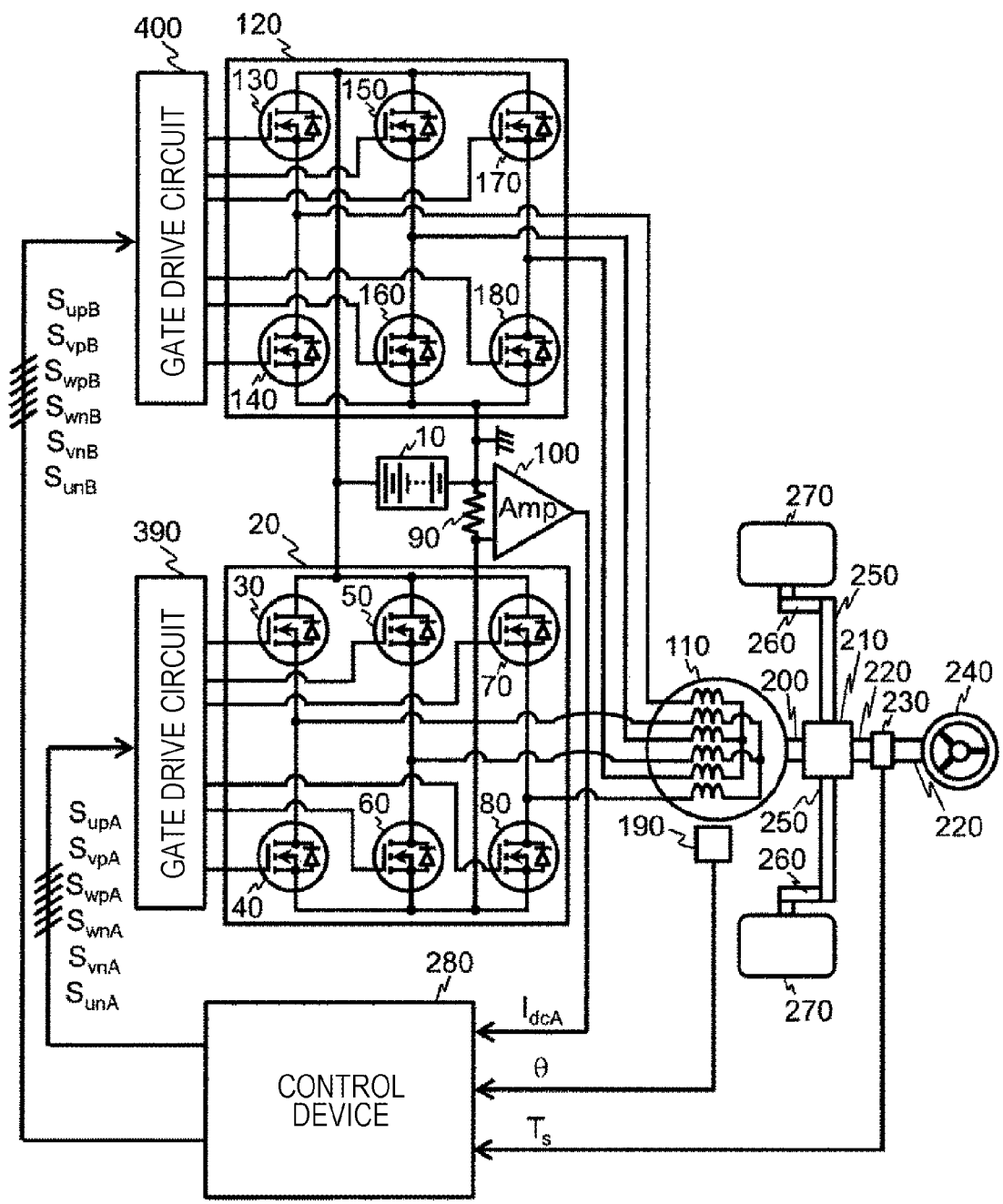
FIG. 1(a) is a diagram illustrating an electric power steering apparatus according to a first embodiment.

A case where an inverter control device according to the present invention is applied to an electric power steering apparatus will now be described. Note that, in each drawing, like reference numerals denote like elements, and they will not be described repeatedly.

First Embodiment (Overview of Electric Power Steering Apparatus)

FIG. 1(a) is a diagram illustrating an electric power steering apparatus according to the first embodiment.

The electric power steering apparatus according to the first embodiment includes a battery 10, a first inverter 20, a shunt resistance 90, an amplifier 100, a gate drive circuit 390 of the first inverter 20, a second inverter 120, a gate drive circuit 400 of the second inverter 120, a control device 280, a motor 110, an angle detector 190, an output shaft 200 of the motor 110, a gearbox 210, a manual steering gear 250, tie rods 260, vehicle wheels 270, a rod 220, a torque sensor 230, and a driver-operated steering 240. The shunt resistance 90 according to the first embodiment is provided to detect a DC bus current IdcA (hereinafter, referred to as a first DC bus current IdcA) of the first inverter 20. The amplifier 100 is provided to amplify a voltage between both ends of the shunt resistance 90. The angle detector 190 is provided to detect a magnetic pole position of a rotor of the motor 110.

The electric power steering apparatus is configured to apply a motor drive device to the steering device to reduce (assist) a driver's manipulation load to the steering 240. As a driver rotates the steering 240, a torque is transmitted to the manual steering gear 250 through the rod 220 and the gearbox 210. The torque transmitted to the manual steering gear 250 is compensated by a torque generated in the motor 110, and is transmitted to left and right vehicle wheels 270 through left and right tie rods 260. As a result, the left and right vehicle wheels 270 are steered.

The battery 10 is connected to DC sides of the first and second inverters 20 and 120 to supply a DC voltage to the first and second inverters 20 and 120. A negative electrode side of the battery 10 and a low-potential side bus of the DC side of the first inverter 20 are connected to each other through the shunt resistance 90. Although it is assumed here that the shunt resistance 90 is connected to the negative electrode side of the battery 10 and the low-potential side bus of the first inverter 20, the shunt resistance may also be connected between a positive electrode side of the battery 10 and a high-potential side bus of the DC side of the first inverter 20. Alternatively, the shunt resistance may also be connected between the positive electrode side (negative electrode side) of the battery 10 and the high-potential side bus (low-potential side bus) of the DC side of the second inverter 120. Alternatively, the shunt resistance may be respectively connected between any one of upper arms of each phase (lower arms of each phase) of the first and second inverters 20 and 120 and the high-potential side bus (low-potential side bus). Alternatively, a Hall type current sensor may be provided in the AC bus side of each phase in any one of the first and second inverters 20 and 120.

The three-phase AC bus side of the first inverter 20 is connected to a first three-phase coil wound around a stator of the motor 110. The three-phase AC bus side of the second inverter 120 is connected to the second three-phase coil wound around the stator of the motor 110.

The switching elements 30 to 80 of the upper and lower arms of each phase of the first inverter 20 are turned on or off on the basis of the first PWM signals SupA, SunA, SvpA, SvnA, SwpA, and SwnA generated from the control device 280 to transform the DC voltage supplied from the battery 10 into a three-phase AC voltage having a variable voltage and a variable frequency. Similarly, the switching elements 130 to 180 of the upper and lower arms of each phase of the second inverter 120 are turned on or off on the basis of second PWM signals SupB, SunB, SvpB, SvnB, SwpB, and SwnB generated from the control device 280 to transform the DC voltage supplied from the battery 10 into a three-phase AC voltage having a variable voltage and a variable frequency. In addition, the first and second inverters 20 and 120 applies the transformed three-phase AC voltage to the first and second three-phase coils wound around the stator of the motor 110 to generate the three-phase AC current in each of the first and second three-phase coils.

The motor 110 generates a rotating magnetic field depending on the three-phase AC current flowing to the first and second three-phase coils wound around the stator and generates a torque for accelerating or decelerating a rotor (not illustrated) on the basis of the generated rotating magnetic field. In addition, the motor 110 outputs the generated torque to the output shaft 200 and supplies the torque to the manual steering gear 250 via the gearbox 210.

A main circuit of the first inverter 20 according to the first embodiment has switching elements 30 to 80. The switching elements 30 to 80 are formed by combining a metal-oxide-semiconductor field effect transistor (MOSFET) or an insulated gate bipolar transistor (IGBT) and a diode. A circuit configuration of the first inverter 20 according to the first embodiment is similar to that of the related art, and it will not be described in details here.

The switching element 30 of the U-phase upper arm of the first inverter 20 is turned on or off on the basis of the first PWM signal SupA voltage-amplified by the gate drive circuit 390. Similarly, the switching elements 40, 50, 60, 70, and 80 of the first inverter 20 are turned on or off on the basis of the first PWM signals SunA, SvpA, SvnA, SwpA, and SwnA, respectively, voltage-amplified by the gate drive circuit 390.

The main circuit of the second inverter 120 is also configured similarly to that of the first inverter 20. The switching element 130 of the U-phase upper arm of the second inverter 120 is turned on or off on the basis of the second PWM signal SupB voltage-amplified by the gate drive circuit 400. Similarly, the switching elements 140, 150, 160, 170, and 180 of the second inverter 120 are turned on or off on the basis of the second PWM signals SunB, SvpB, SvnB, SwpB, and SwnB, respectively, voltage-amplified by the gate drive circuit 400.

(Processing of Control Device 280)

Figure 1B:
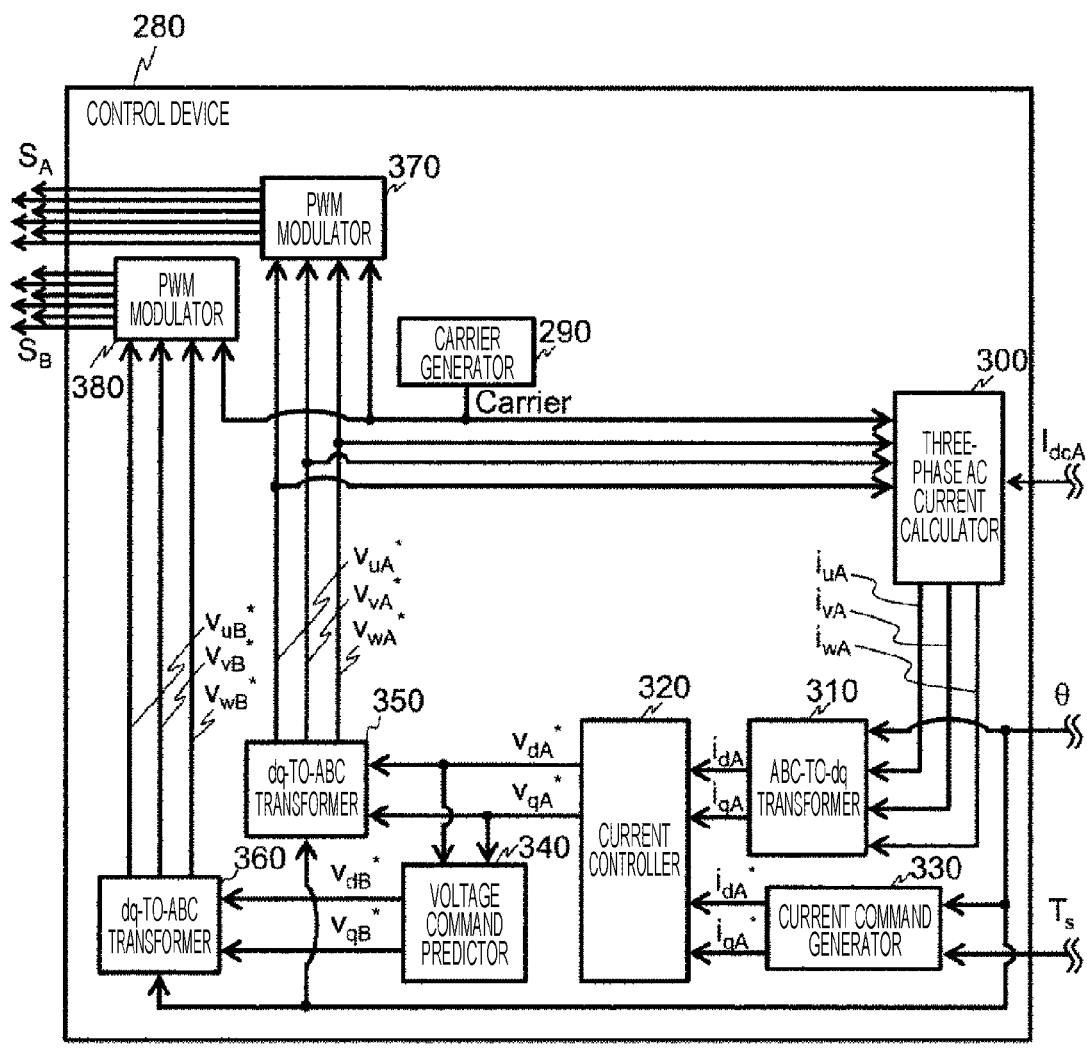
FIG. 1(b) is a diagram illustrating a configuration of a control device 280 according to the first embodiment.

A configuration and processing details of the control device 280 will be described with reference to FIG. 1(b). The control device 280 includes a carrier generator 290, a three-phase AC current calculator 300, an abc-to-dq transformer 310, a current controller 320, a current command generator 330, a voltage command predictor 340, dq-to-abc transformers 350 and 360, and PWM modulators 370 and 380. As illustrated in FIG. 1(a), the control device 280 receives a first DC bus current IdcA detected by the shunt resistance 90 and the amplifier 100, a magnetic pole position θ of the rotor of the motor 110 detected by the angle sensor 190, and a torque Ts detected by the torque sensor 230 and transmitted from the steering 240 to the rod 220.

The three-phase AC current calculator 300 acquires the first DC bus current IdcA flowing to the first inverter 20 at the timing determined on the basis of a relationship between a triangular wave carrier Carrier and the first three-phase AC voltage commands vuA*, vvA*, and vwA*. This triangular wave carrier Carrier is generated in the carrier generator 290, and the first three-phase AC voltage commands vuA*, vvA*, and vwA* are generated in a dq-to-abc transformer 350 described below. In addition, the three-phase AC current calculator 300 calculates the first three-phase AC currents iuA, ivA, and iwA flowing to the first three-phase coil of the motor 110 on the basis of the acquired first DC bus current IdcA.

The abc-to-dq transformer 310 calculates a first d-axis current idA flowing to the d-axis of the motor 110 and a first q-axis current iqA flowing to the q-axis on the basis of the first three-phase AC currents iuA, ivA, and iwA and the magnetic pole position θ of the rotor of the motor 110. The current command generator 330 generates a first d-axis current command idA* and a first q-axis current command iqA* of the motor 110 on the basis of the magnetic pole position θ and the torque Ts of the rotor of the motor 110. The current controller 320 generates a first d-axis voltage command vdA* and a first q-axis voltage command vqA* using a proportional plus integral control or the like such that the first d-axis current idA and the first q-axis current iqA match the first d-axis current command idA* and the first q-axis current command iqA*, respectively.

The dq-to-abc transformer 350 calculates the first three-phase AC voltage commands vuA*, vvA*, and vwA* on the basis of the first d-axis voltage command vdA*, the first q-axis voltage command vqA*, and the magnetic pole position θ of the rotor of the motor 110. The PWM modulator 370 generates the first PWM signals SupA, SunA, SvpA, SvnA, SwpA, and SwnA of the upper and lower arms of each phase of the first inverter 20 on the basis of the first three-phase AC voltage commands vuA*, vvA*, and vwA* and the triangular wave carrier Carrier.

The voltage command predictor 340 predicts a second d-axis voltage command vdB* and a second q-axis voltage command vqB* on the basis of the first d-axis voltage command vdA* and the first q-axis voltage command vqA*. The dq-to-abc transformer 360 generates second three-phase AC voltage commands vuB*, vvB*, and vwB* on the basis of the second d-axis voltage command vdB* and the second q-axis voltage command vqB*. The PWM modulator 380 generates PWM signals SupB, SunB, SvpB, SvnB, SwpB, and SwnB of the upper and lower arms of each phase of the second inverter 120 on the basis of the second three-phase AC voltage commands vuB*, vvB*, and vwB* and the triangular wave carrier Carrier.

In the first embodiment, the voltage command predictor 340 predicts the second d-axis voltage command vdB* and the second q-axis voltage command vqB* on the basis of the first d-axis voltage command vdA* and the first q-axis voltage command vqA*. Alternatively, the second three-phase AC voltage commands vuB*, vvB*, and vwB* may be predicted on the basis of the first three-phase AC voltage commands vuA*, vvA*, and vwA*.

In this manner, compared to a method of detecting the DC bus currents of all channels by generating the voltage command of the inverter of the second channel and generating the voltage command of the inverter of all channels on the basis of a current control such as a proportional component control, it is possible to remarkably reduce processing loads for a current detection process, a three-phase AC current calculation process, an abc-to-dq transformation process, and a current control process. That is, it is possible to reduce a computation amount for controlling the second inverter 120 and the motor 110.

(Processing of Three-Phase AC Current Calculator 300)

Figure 2:
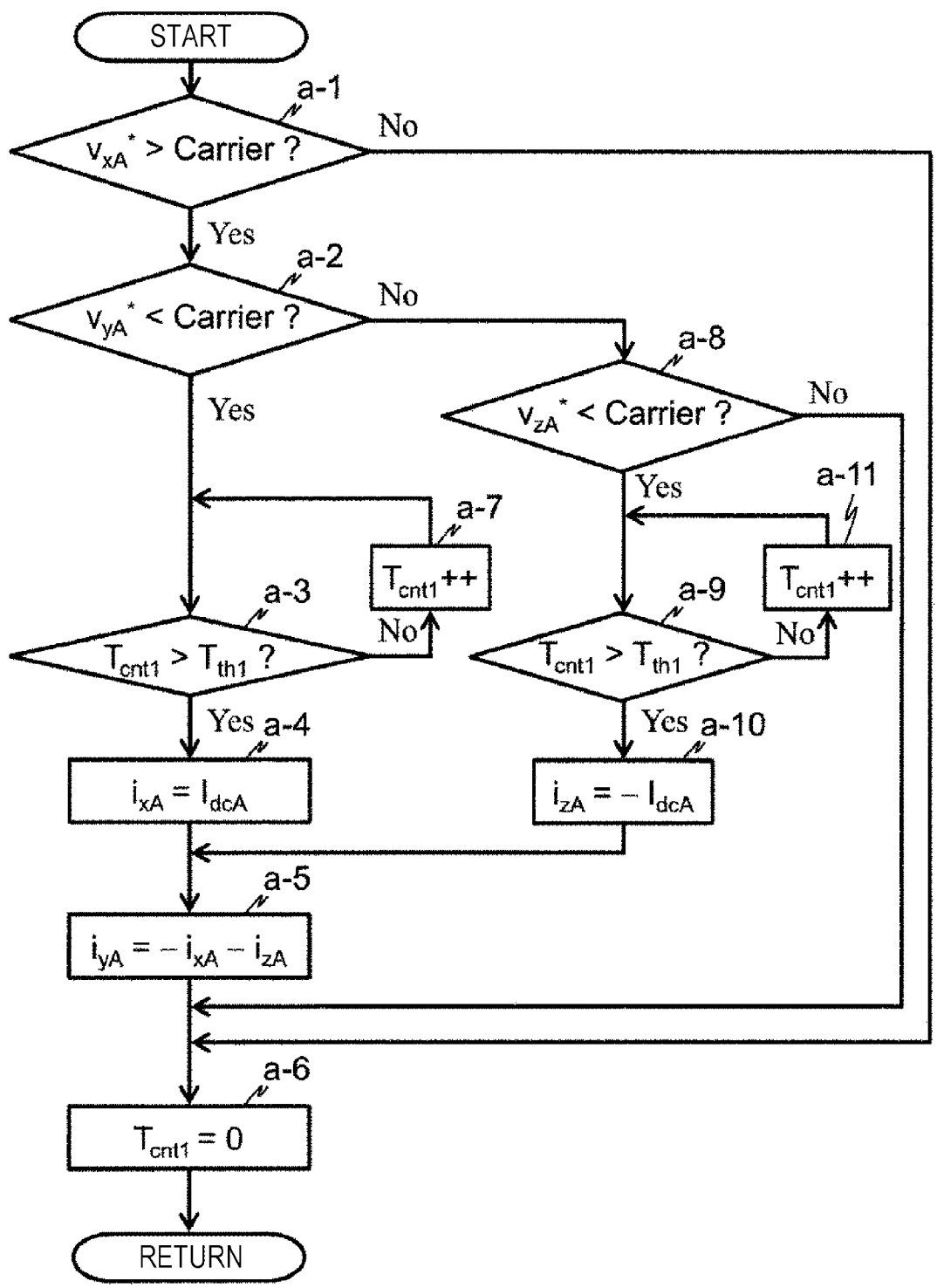
FIG. 2 is a diagram illustrating a processing sequence of a three-phase AC current calculator 300 according to the first embodiment.

FIG. 2 is a diagram illustrating a processing sequence of the three-phase AC current calculator 300. As described above in conjunction with FIG. 1 (b), the three-phase AC current calculator 300 acquires the first DC bus current IdcA flowing to the first inverter 20 at the timing determined on the basis of a relationship between the triangular wave carrier Carrier and the first three-phase AC voltage commands vuA*, vvA*, and vwA* and calculates the first three-phase AC currents iuA, ivA, and iwA on the basis of the acquired first DC bus current IdcA.

In FIG. 2, a first maximum phase voltage command is defined as a first X-phase AC voltage command vxA*, a first intermediate phase voltage command is defined as a first Y-phase AC voltage command vyA*, and a first minimum phase voltage command is defined as a first Z-phase AC voltage command vzA*. That is, the subscripts "x, y, and z" of vxA*, vyA*, vzA*, ixA, iyA, and izA of FIG. 2 are substituted with any one of "u, v, and w" depending on a relationship of the maximum phase, the intermediate phase, and the minimum phase of the first three-phase AC voltage commands vuA*, vvA*, and vwA*.

In step a-1, it is determined whether or not the first X-phase AC voltage command vxA* (first maximum phase voltage command) is higher than the triangular wave carrier Carrier. If vxA* is higher than Carrier, in step a-2, it is determined whether or not the first Y-phase AC voltage command vyA* (first intermediate phase voltage command) is lower than the triangular wave carrier Carrier. If vyA* is lower than Carrier, the process advances to step a-3. If vyA* is not lower than Carrier, in step a-8, it is determined whether or not the first Z-phase AC voltage command vzA* (first minimum phase voltage command) is lower than the triangular wave carrier Carrier.

In step a-3, it is determined whether or not the first timer counter value Tcnt1 is greater than a predetermined threshold value Tth1. If Tcnt1 is not greater than Tth1, in step a-7, Tcnt1 is counted up, and then, step a-3 is repeated. If Tcnt1 is greater than Tth1, in step a-4, the first DC bus current IdcA is detected, and the first X-phase AC current ixA is calculated on the basis of Formula (1).

[Formula 1]

$$i_{xA} = I_{dcA} \quad (1)$$

Then, in step a-5, the first X-phase AC current ixA and the first Z-phase AC current izA calculated in step a-10 described below are applied to Formula (2) to calculate the first Y-phase AC current iyA.

[Formula 2]

$$i_{yA} = -i_{xA} - i_{zA} \quad (2)$$

In step a-6, the first timer counter value Tcnt1 is reset to zero, and the process returns to step a-1.

If it is determined in step a-8 that the first Z-phase AC voltage command vzA* (first minimum phase voltage command) is lower than the triangular wave carrier Carrier, it is determined in step a-9 whether or not the first timer counter value Tcnt1 is greater than a predetermined threshold value Tth1. If Tcnt1 is not greater than Tth1, Tcnt1 is counted up in step a-11, and then, step a-9 is repeatedly processed. If Tcnt1 is greater than Tth1, the first DC bus current IdcA is detected in step a-10, and the first Z-phase AC current izA is calculated on the basis of Formula (3).

[Formula 3]

$$i_{zA} = -I_{dcA} \tag{3}$$

If it is determined in step a-8 that the first Z-phase AC voltage command vzA* (first minimum phase voltage command) is not lower than the triangular wave carrier Carrier, the process advances to step a-6, so that the first timer counter value Tcnt1 is reset to zero, and then, the process returns to step a-1. This similarly applies to a case where it is determined in step a-1 that the first X-phase AC voltage command vxA* (first maximum phase voltage command) is not higher than the triangular wave carrier Carrier.

Figure 3:
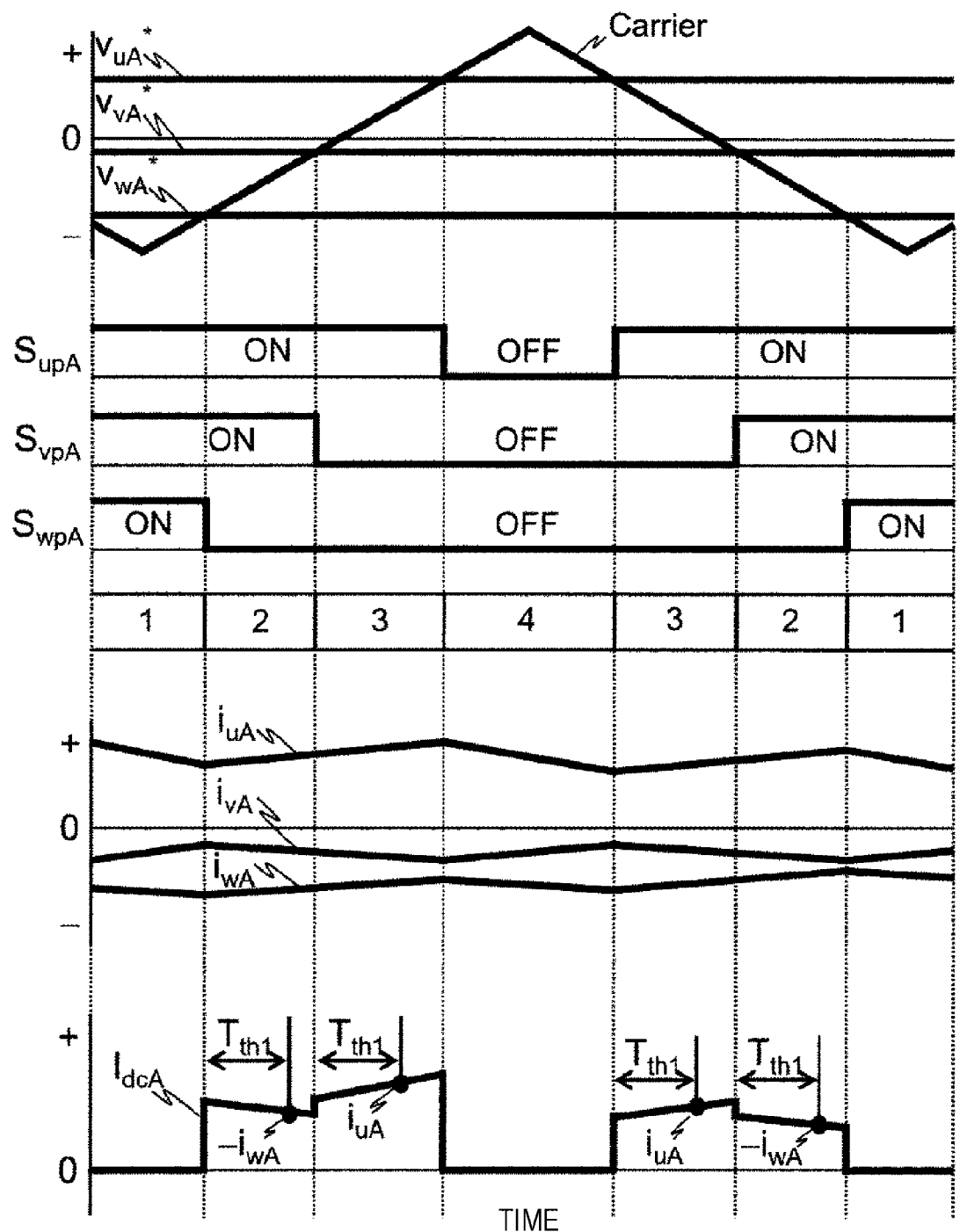
FIG. 3 is a diagram illustrating a relationship between a PWM signal, a three-phase AC current, and a DC bus current.
Figure 4A:
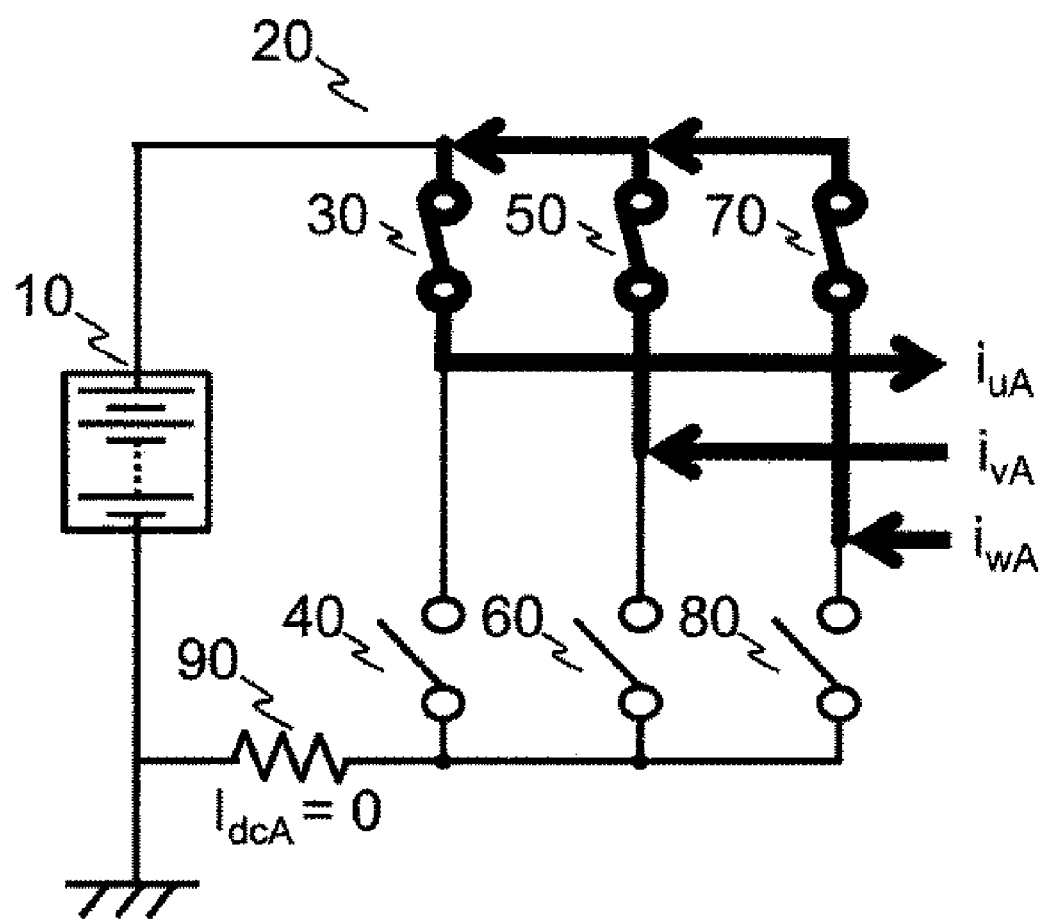
FIG. 4 (a) is a diagram illustrating a current path under a switch mode 1 of FIG. 3.
Figure 4B:
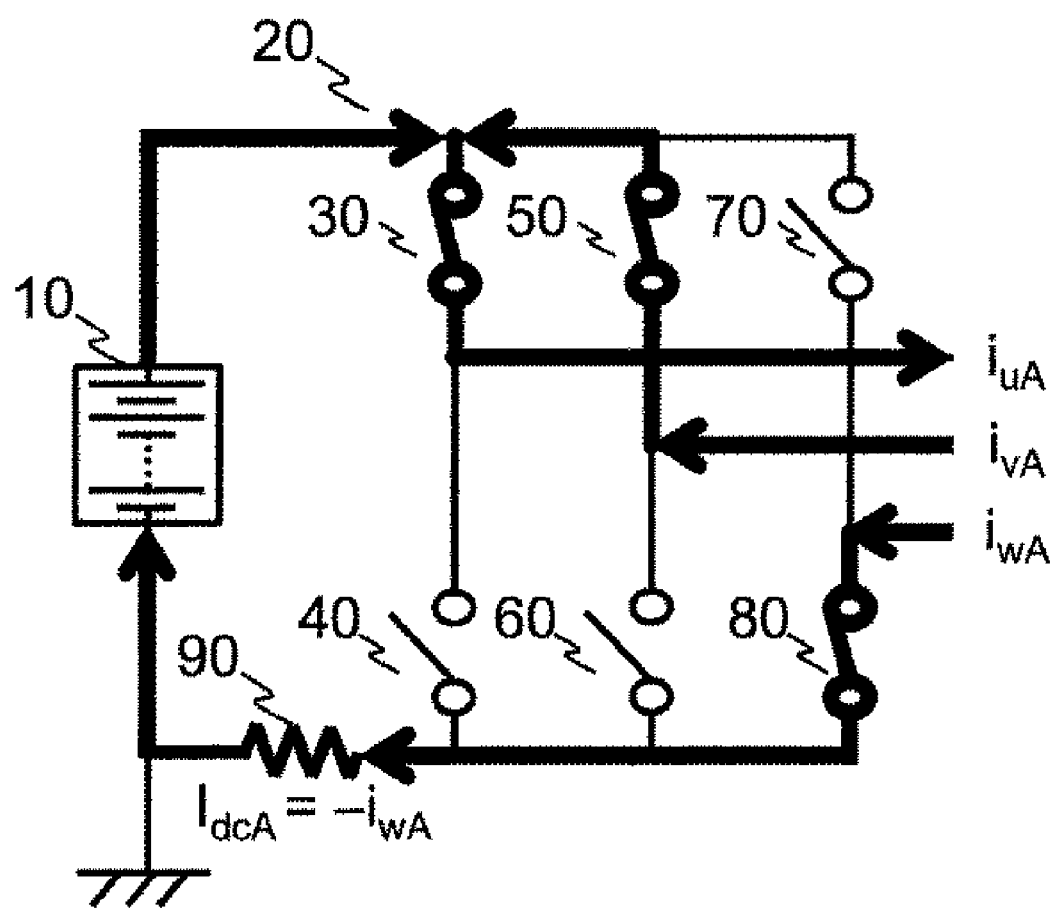
Figure 4C:
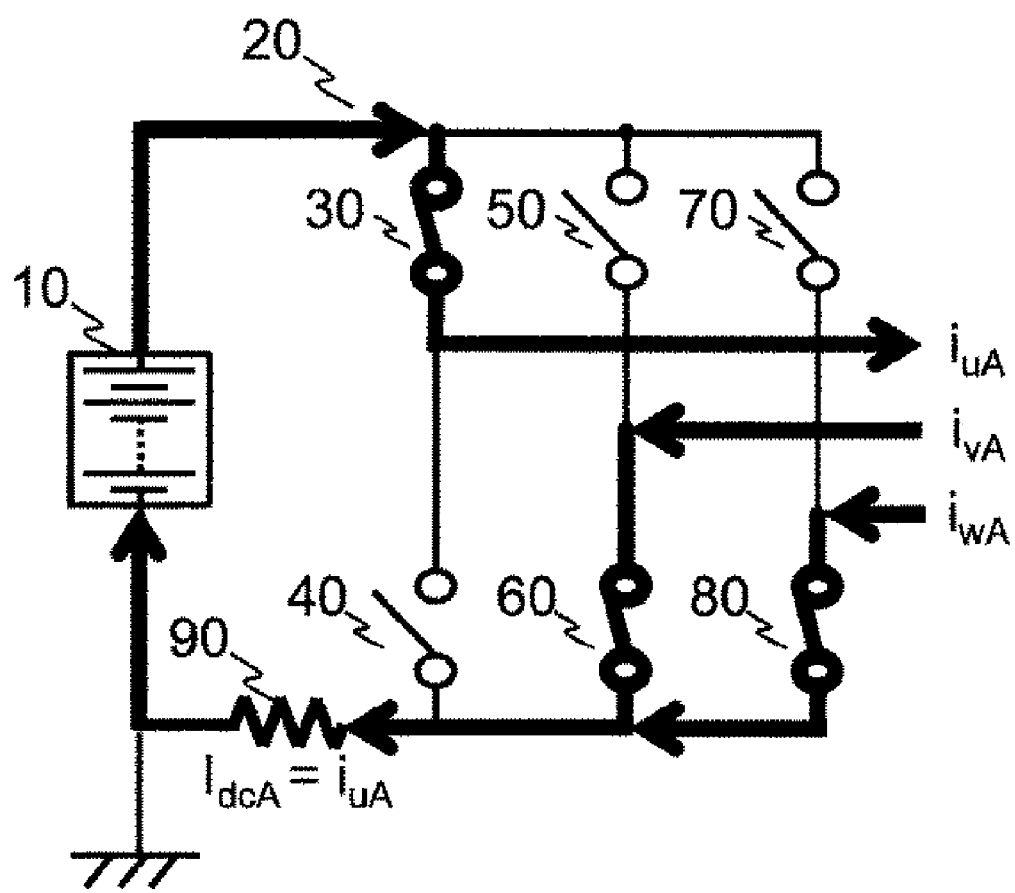
Figure 4D:
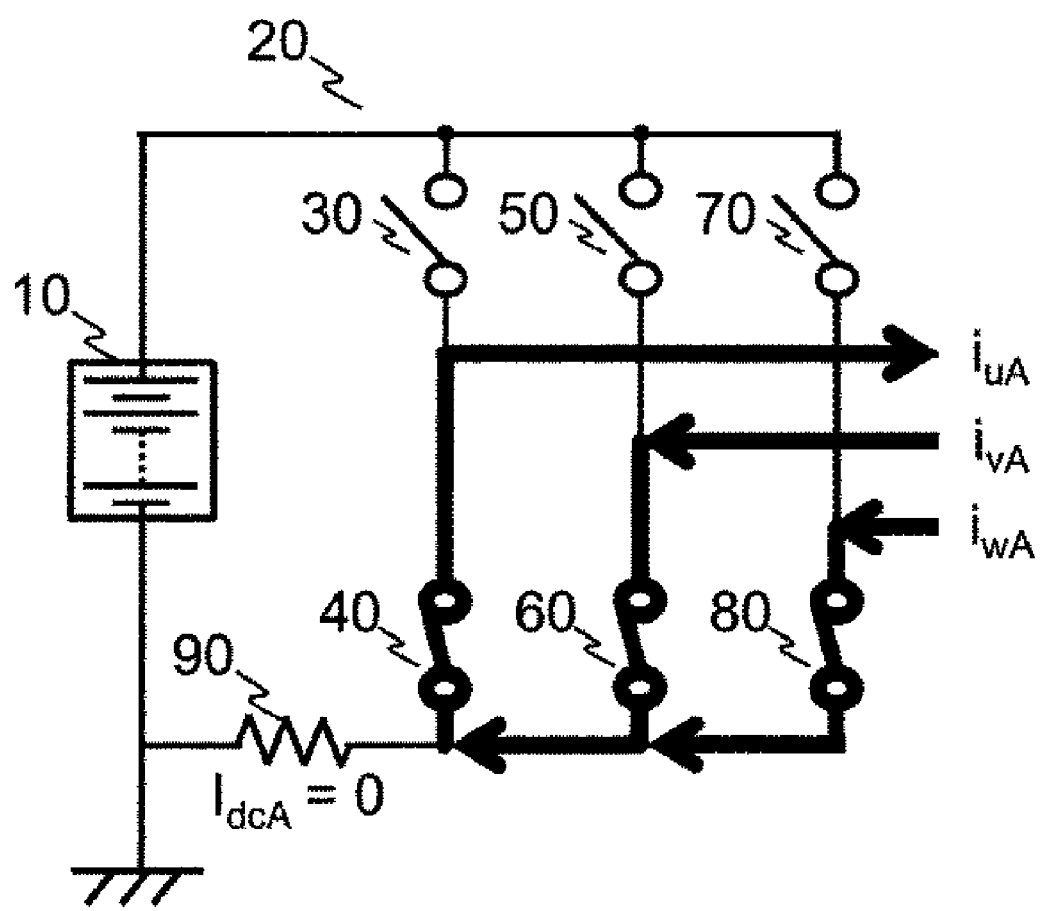

FIG. 3 is a diagram illustrating a relationship between the PWM signals SupA, SvpA, and SwpA of the first upper arm of each phase, the first three-phase AC currents iuA, ivA, and iwA, and the first DC bus current IdcA. A principle of calculating the first three-phase AC currents iuA, ivA, and iwA from the first DC bus current IdcA using the three-phase AC current calculator 300 will be described with reference to FIG. 3.

In FIG. 3, the maximum phase, the intermediate phase, and the minimum phase are set to the U-phase, the V-phase, and the W-phase, respectively. In addition, the three-phase AC currents iuA, ivA, and iwA are defined as positive when they flow from the first inverter 20 to the three-phase coil of the motor 110. In addition, the first DC bus current IdcA is defined as positive when it flows from the low-potential side bus of the first inverter 20 to the negative electrode side of the battery 10.

The PWM signals SupA, SvpA, and SwpA of the first upper arm of each phase are generated by comparing the first three-phase AC voltage commands vuA*, vvA*, and vwA* and the carrier Carrier. That is, the PWM signal SupA is turned on when vuA* is higher than Carrier, and is turned off when vuA* is lower than Carrier. This similarly applies to the PWM signals SvpA and SwpA.

In the PWM signals of the first upper arm of each phase generated in this manner, a switch mode 1 is set when all of SupA, SvpA, and SwpA are turned on. In addition, a switch mode 2 is set when SupA and SvpA are turned on, and SwpA is turned off. In addition, a switch mode 3 is set when SupA is turned on, and SvpA and SwpA are turned off. In addition, a switch mode 4 is set when all of SupA, SvpA, and SwpA are turned off.

Although described below in details with reference to FIG. 4, in the switch mode 1, the first three-phase AC currents iuA, ivA, and iwA flow, but the first DC bus current IdcA does not flow. In the switch mode 2, the first DC bus current IdcA becomes "−iwA". In the switch mode 3, the first DC bus current IdcA is equal to "iuA". In the switch mode 4, similarly to the switch mode 1, the first three-phase AC currents iuA, ivA, and iwA flow, but the first DC bus current IdcA does not flow.

Therefore, the first three-phase AC currents iuA, ivA, and iwA are calculated using Formulas (4) to (6), respectively, on the basis of the processing sequence of FIG. 2 and the first DC bus current IdcA detected in the switch modes 2 and 3.

[Formula 4]

$$i_{wA} = -I_{dcA} \text{ (Switch mode: 2)} \tag{4}$$

[Formula 5]

$$i_{uA} = I_{dcA} \text{ (Switch mode: 3)} \tag{5}$$

[Formula 6]

$$i_{vA} = -i_{uA} - i_{wA} \tag{6}$$

FIG. 4 is a diagram illustrating a current path of the first three-phase AC currents iuA, ivA, and iwA and the first DC bus current IdcA corresponding to the switch mode of FIG. 3. FIG. 4(a) illustrates the switch mode 1, FIG. 4(b) illustrates the switch mode 2, FIG. 4(c) illustrates the switch mode 3, and FIG. 4(d) illustrates the switch mode 4.

In the switch mode 1, the first three-phase AC currents iuA, ivA, and iwA flow only between the switching elements 30, 50, and 70 of the upper arm of each phase and the three-phase coil (not illustrated) of the motor 110. Therefore, since no current flows to the shunt resistance 90, the first DC bus current Idc becomes zero.

In the switch mode 2, the first W-phase AC current iwA flows to the negative electrode side of the battery 10 through the switching element 80 of the W-phase lower arm and the shunt resistance 90. In addition, the first W-phase AC current iwA flowing from the positive electrode side of the battery 10 is mixed with the first V-phase AC current ivA flowing from the switching element 50 of the V-phase upper arm in the U-phase direction to form the first U-phase AC current iuA, and the U-phase AC current iuA flows to the U-phase coil (not illustrated) of the motor 110 through the switching element 30 of the U-phase upper arm. Therefore, in the switch mode 2, since the first W-phase AC current iwA flows to the shunt resistance 90, the first DC bus current Idc becomes the first W-phase AC current iwA. However, at this time, the first DC bus current IdcA has a positive direction, but the first W-phase AC current iwA has a negative direction. Therefore, a relationship between the first DC bus current IdcA and the first W-phase AC current iwA is expressed as Formula (7). Formula (7) is equivalent to Formula (4) described above.

[Formula 7]

$$I_{dcA} = -i_{wA} \tag{7}$$

In the switch mode 3, the first U-phase AC current iuA flows to the U-phase coil (not illustrated) of the motor 110 through the battery 10 and the switching element 30 of the U-phase upper arm. The first U-phase AC current iuA flowing to the U-phase coil (not illustrated) is branched into the V-phase coil (not illustrated) and the W-phase coil (not illustrated) of the motor 110 as the first V-phase AC current ivA and the first W-phase AC current iwA. In addition, the first V-phase AC current ivA flowing from the V-phase coil (not illustrated) to the switching element 60 of the V-phase lower arm is mixed with the first W-phase AC current iwA flowing from the W-phase coil (not illustrated) to the switching element 80 of the W-phase lower arm to form the first U-phase AC current iuA, and the first U-phase AC current iuA flows to the shunt resistance 90. Therefore, in the switch mode 3, since the first U-phase AC current iuA flows to the shunt resistance 90, the first DC bus current Idc becomes the first U-phase AC current iuA. At this time, the first DC bus current IdcA has a positive direction, and the first U-phase AC current iuA has a positive direction. Therefore, a relationship between the first DC bus current IdcA and the first U-phase AC current iuA is expressed as Formula (8). Formula (8) is equivalent to Formula (5) described above.

[Formula 8]

$$I_{dcA}=i_{uA} \tag{8}$$

In the switch mode 4, the first three-phase AC currents iuA, ivA, and iwA flow only between the switching elements 40, 60, and 80 of the lower arm of each phase and the three-phase coil (not illustrated) of the motor 110. Therefore, since no current flows to the shunt resistance 90, the first DC bus current Idc becomes zero.

According to the first embodiment, on the basis of such a relationship, the first three-phase AC currents iuA, ivA, and iwA are calculated using the first DC bus current IdcA flowing to the shunt resistance 90.

(Processing of abc-to-dq Transformer 310)

Figure 5:
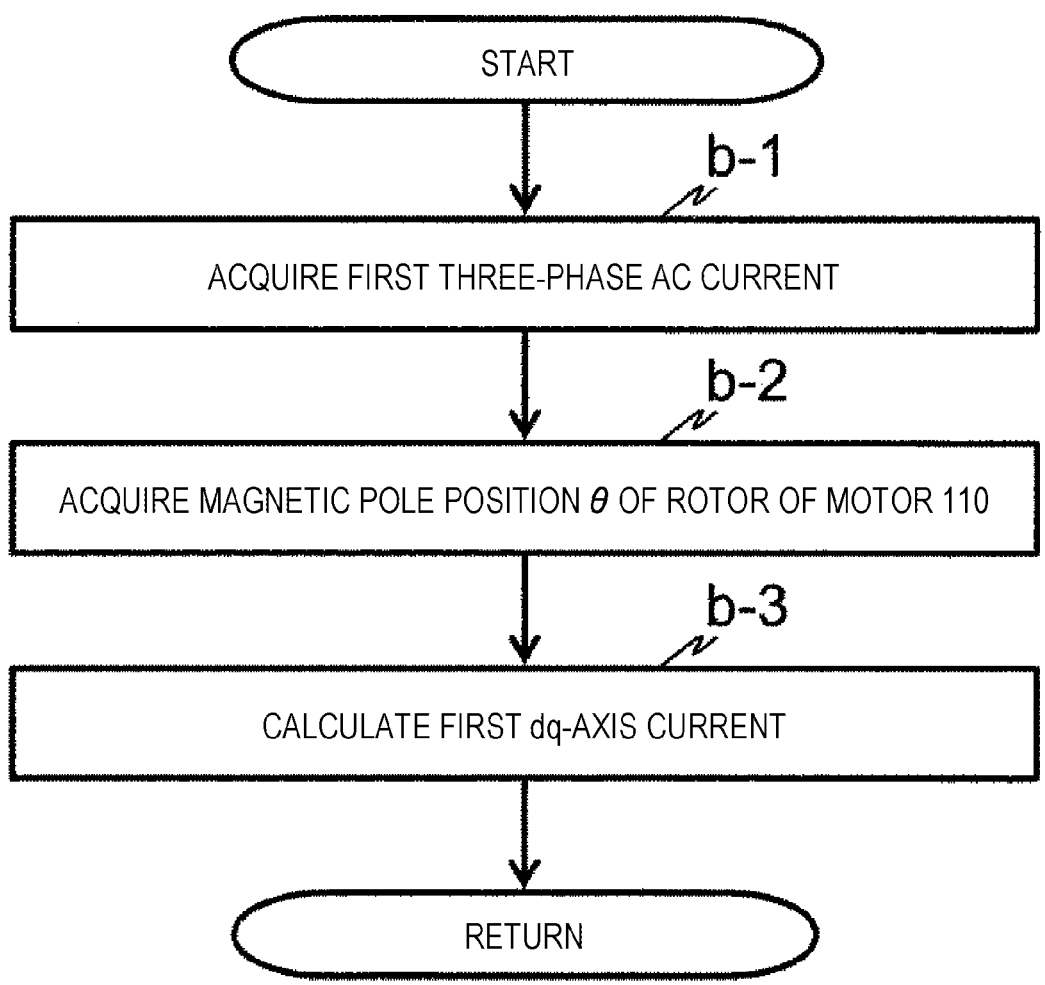
FIG. 5 is a diagram illustrating a processing sequence of an abc-to-dq transformer 310.

FIG. 5 is a diagram illustrating a processing sequence for calculating the first d-axis current idA and the first q-axis current iqA using the abc-to-dq transformer 310.

In step b-1, the first three-phase AC currents iuA, ivA, and iwA calculated by the three-phase AC current calculator 300 are acquired. In step b-2, the magnetic pole position θ of the rotor of the motor 110 detected by the angle sensor 190 is acquired. In step b-3, the first three-phase AC currents iuA, ivA, and iwA and the magnetic pole position θ of the rotor of the motor 110 are applied to Formula (9), so as to calculate the first d-axis current idA and the first q-axis current iqA.

[Formula 9]

$$\begin{bmatrix} i_{dA} \\ i_{qA} \end{bmatrix} = \frac{2}{3} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} i_{uA} \\ i_{vA} \\ i_{wA} \end{bmatrix} \tag{9}$$

(Processing of Current Command Generator 330)

Figure 6:
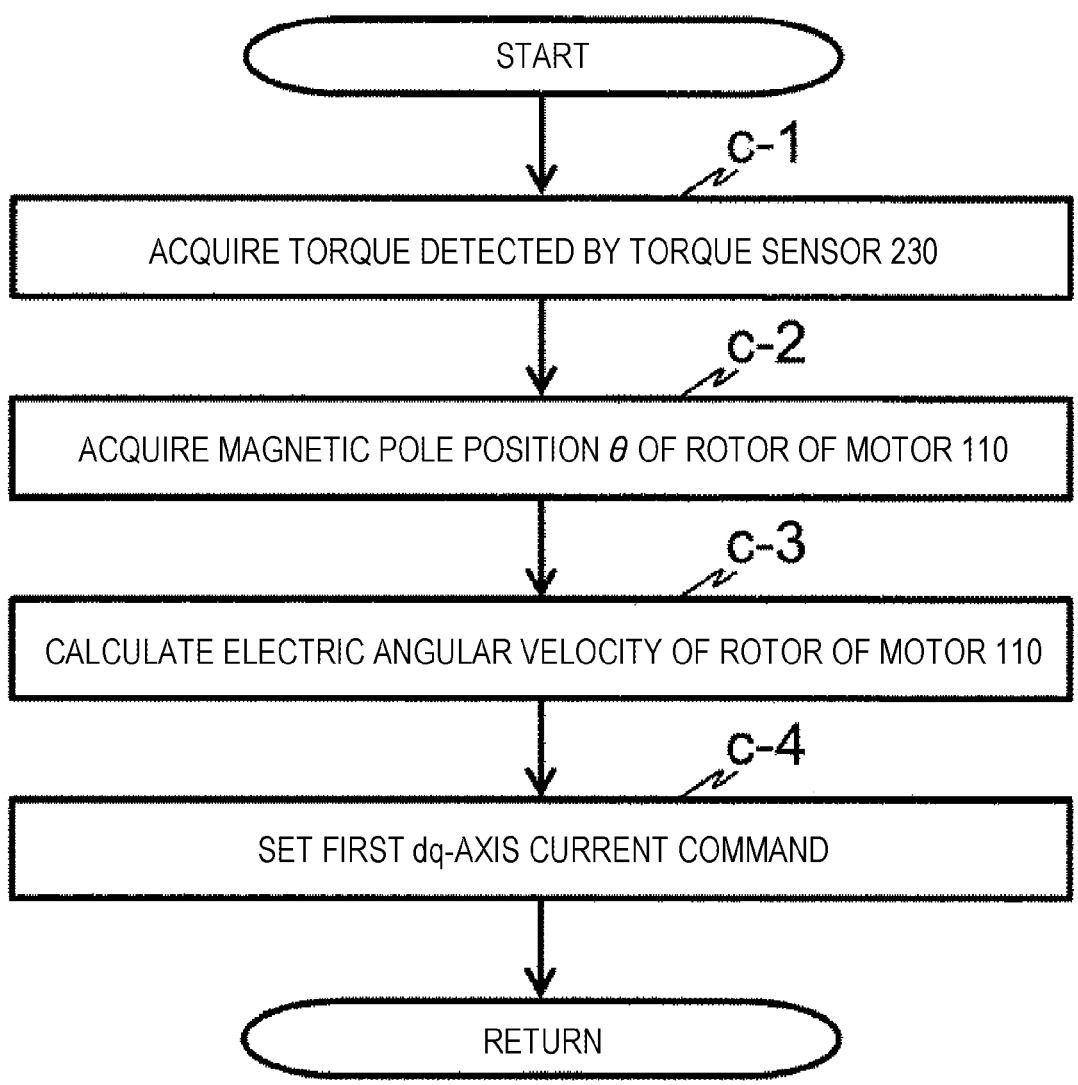
FIG. 6 is a diagram illustrating a processing sequence of a current command generator 330.

FIG. 6 is a diagram illustrating a processing sequence for generating the first d-axis current command idA* and the first q-axis current command iqA* using the current command generator 330.

In step c-1, the torque Ts detected by the torque sensor 230 is acquired. In step c-2, the magnetic pole position θ of the rotor of the motor 110 detected by the angle sensor 190 is acquired. In step c-3, an electrical angular velocity ω of the rotor of the motor 110 is calculated on the basis of Formula (10).

[Formula 10]

$$\omega = \frac{d\theta}{dt} \tag{10}$$

In step c-4, the first d-axis current command idA* and the first q-axis current command iqA* corresponding to the torque Ts and the electrical angular velocity ω are set. A specific example of the processing will be described with reference to FIG. 7.

Figure 7:
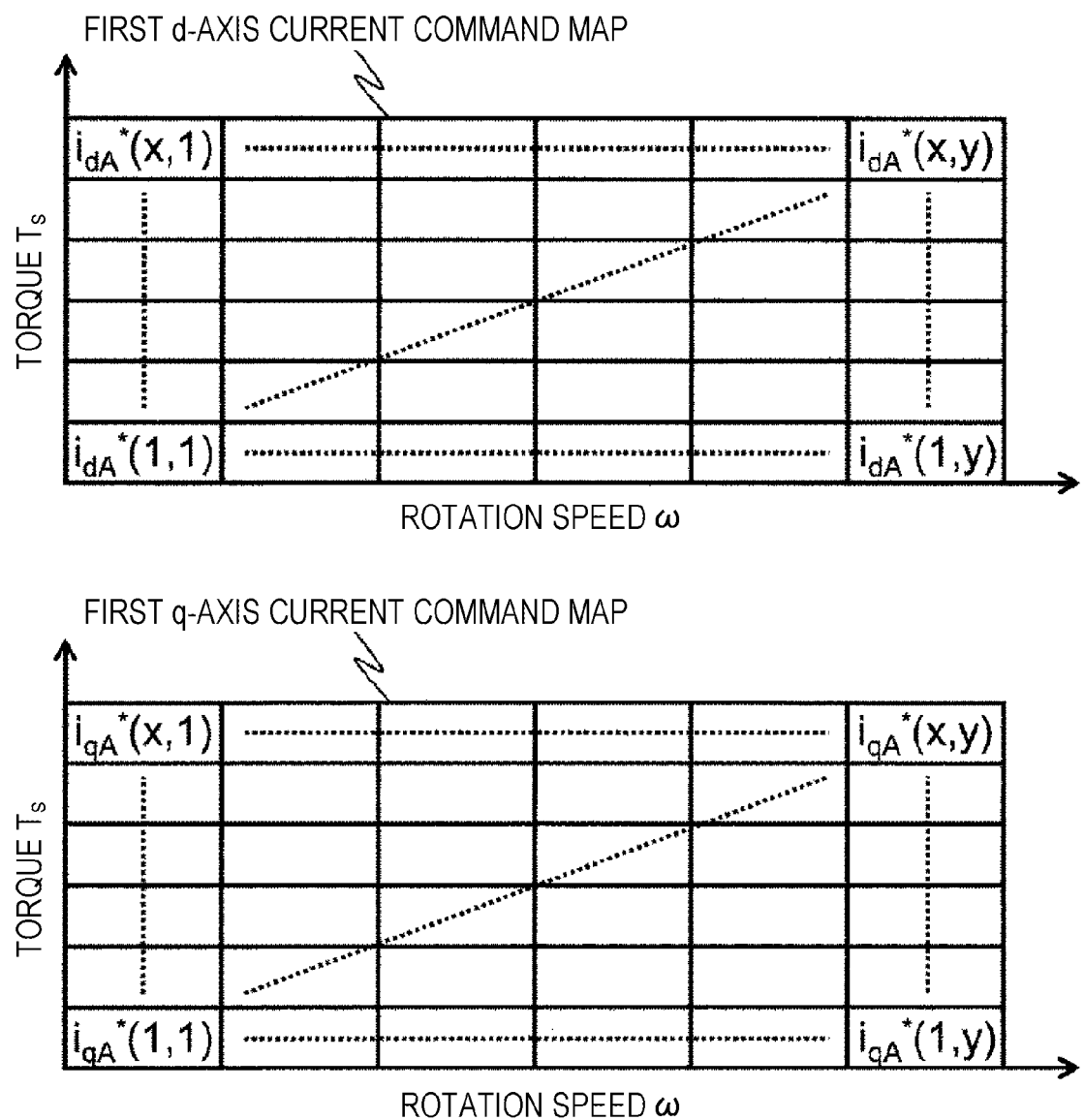
FIG. 7 is a diagram illustrating a first d-axis current command map and a q-axis current command map.

FIG. 7 illustrates a first d-axis current command map and a first q-axis current command map obtained by setting the torque Ts and the electrical angular velocity ω in the ordinate and the abscissa, respectively. These maps are stored in advance in a memory (not illustrated) of the current command generator 330, and the first d-axis current command idA* (x, y) and the first q-axis current command iqA* (x, y) in an array (x, y) corresponding to the torque Ts acquired in step c-1 and the electrical angular velocity ω calculated in step c-3 are called from the memory.

(Processing of Current Controller 320)

Figure 8:
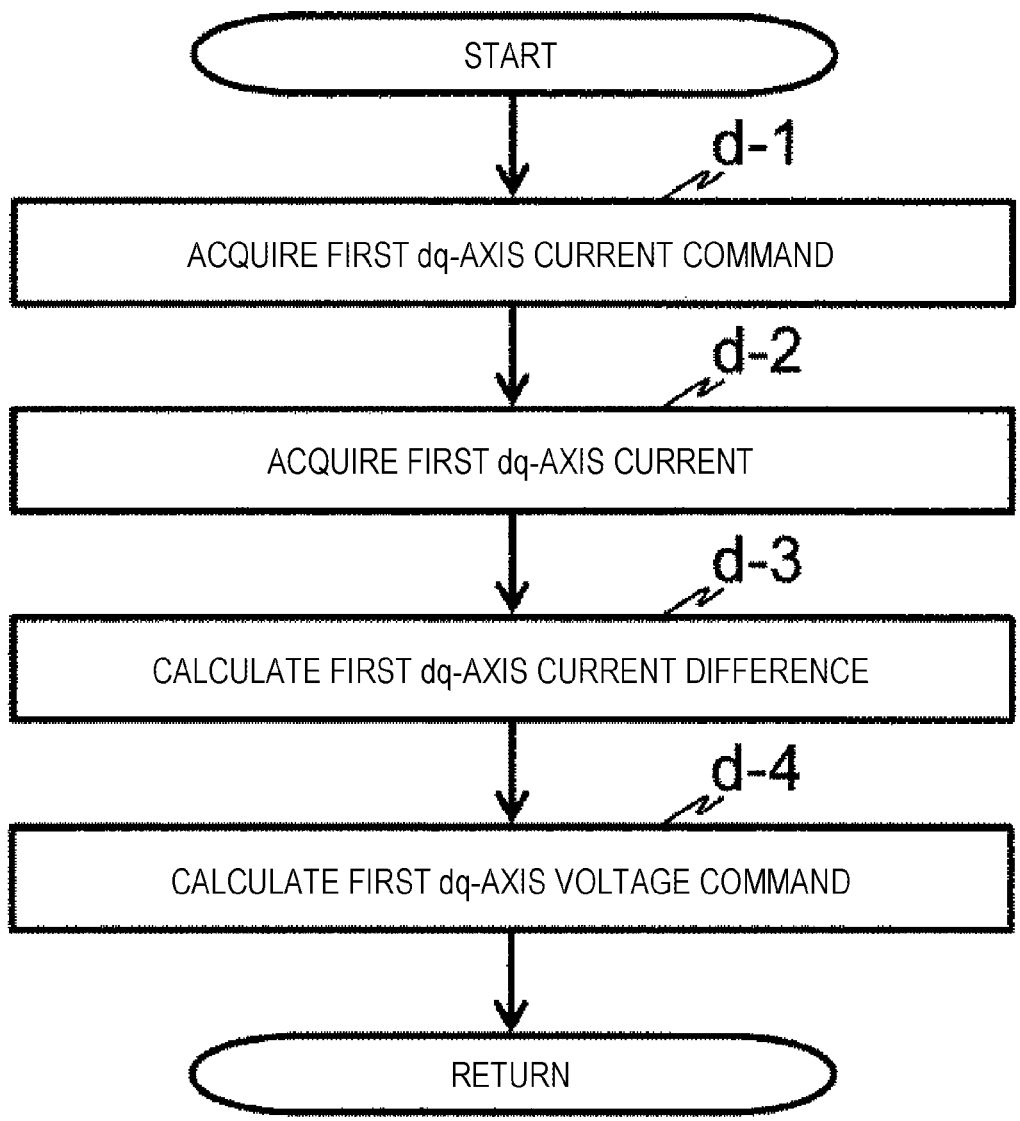
FIG. 8 is a diagram illustrating a processing sequence of a current controller 320.

FIG. 8 is a diagram illustrating a processing sequence for generating the first d-axis voltage command vdA* and the first q-axis voltage command vqA* using the current controller 320.

In step d-1, the first dq-axis current commands idA* and iqA* set by the current command generator 330 are acquired. In step d-2, the first dq-axis currents idA and iqA calculated by the abc-to-dq transformer 310 are acquired. In step d-3, the first dq-axis current differences ΔidA and ΔiqA are calculated on the basis of Formula (11).

[Formula 11]

$$\Delta i_{dA}=i^*_{dA}-i_{dA}$$

$$\Delta i_{qA}=i^*_{qA}-i_{qA} \tag{11}$$

In addition, in step d-4, the first dq-axis voltage commands vdA* and vqA* are calculated on the basis of the first dq-axis current differences ΔidA and ΔiqA calculated in step d-3 and Formula (12). Here, dq-axis proportional gains Kpd and Kpq and dq-axis integral gains Kid and Kiq are stored in advance in the memory (not illustrated) of the current controller 320.

[Formula 12]

$$v^*_{dA}=K_{pd}\Delta i_{dA}+K_{id}\!\int\!\Delta i_{dA}dt$$

$$v^*_{qA}=K_{pq}\Delta i_{qA}+K_{iq}\!\int\!\Delta i_{qA}dt \tag{12}$$

(Processing of dq-to-abc Transformer 350)

Figure 9:
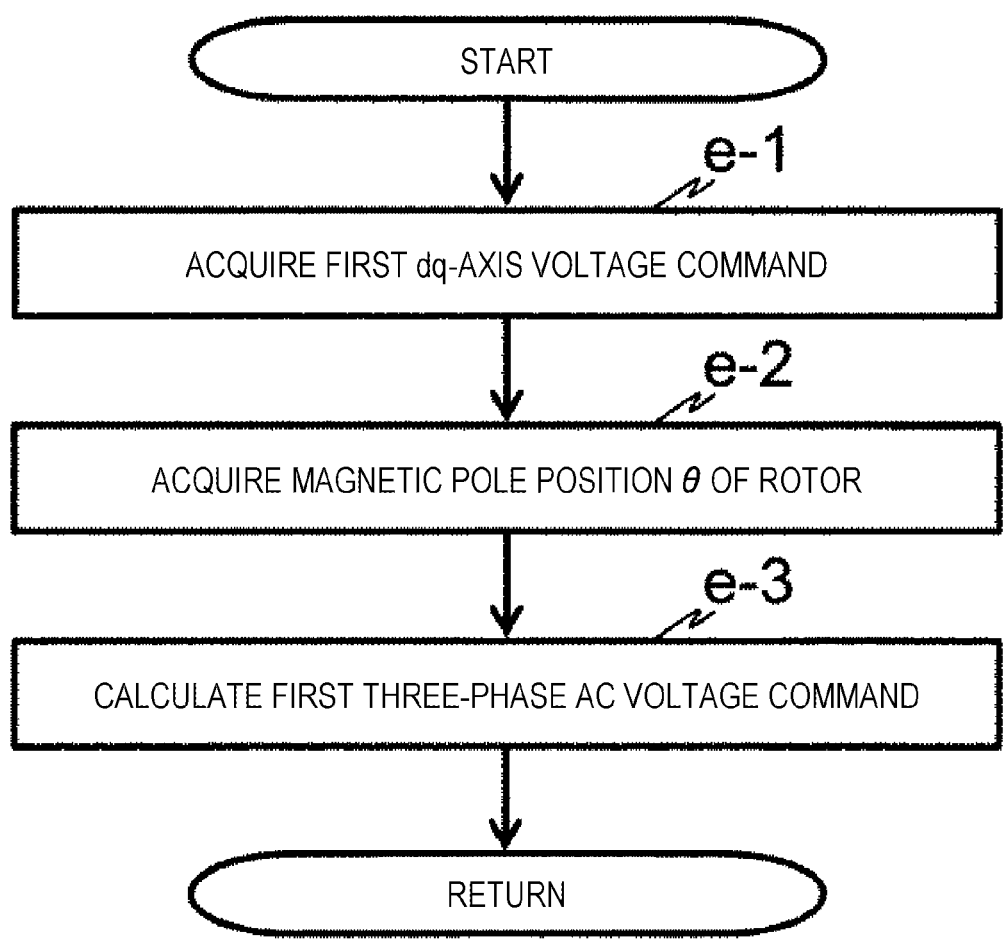
FIG. 9 is a diagram illustrating a processing sequence of a dq-to-abc transformer 350.

FIG. 9 is a diagram illustrating a processing sequence for calculating the first three-phase AC voltage commands vuA*, vvA*, and vwA* using the dq-to-abc transformer 350.

In step e-1, the first dq-axis voltage commands vdA* and vqA* calculated by the current controller 320 are acquired. In step e-2, the magnetic pole position θ of the rotor of the motor 110 detected by the angle sensor 190 is acquired. In step e-3, the first dq-axis voltage commands vdA* and vqA* acquired in step e-1 and the magnetic pole position θ of the rotor of the motor 110 acquired in step e-2 are applied to Formula (13) so as to calculate the first three-phase AC voltage commands vuA*, vvA*, and vwA*.

[Formula 13]

$$\begin{bmatrix} v^*_{uA} \\ v^*_{vA} \\ v^*_{wA} \end{bmatrix} = \begin{bmatrix} \cos\theta & -\sin\theta \\ \cos\left(\theta - \frac{2}{3}\pi\right) & -\sin\left(\theta - \frac{2}{3}\pi\right) \\ \cos\left(\theta + \frac{2}{3}\pi\right) & -\sin\left(\theta + \frac{2}{3}\pi\right) \end{bmatrix} \begin{bmatrix} v^*_{dA} \\ v^*_{qA} \end{bmatrix} \tag{13}$$

(Processing of PWM Modulator 370)

Figure 10:
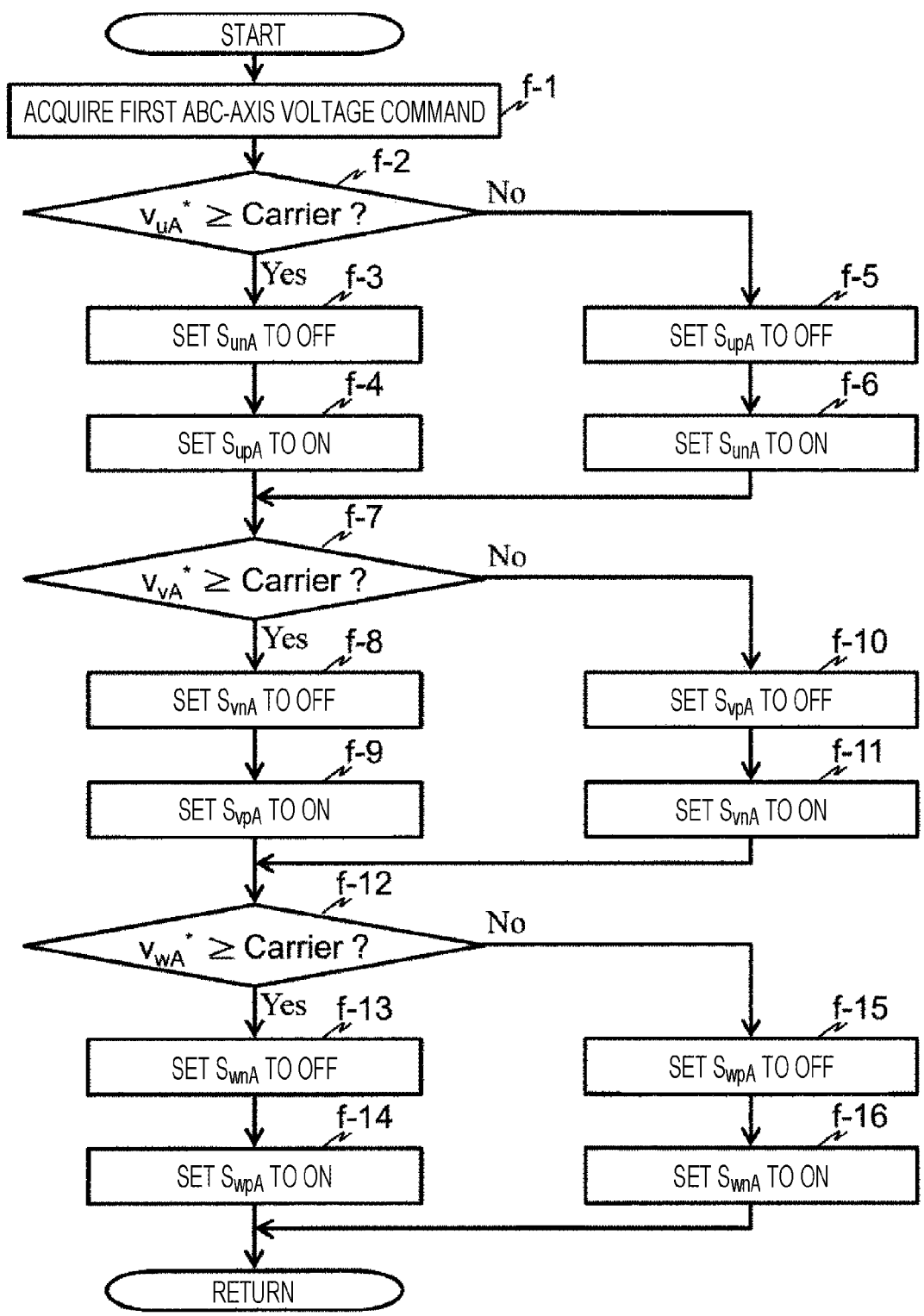
FIG. 10 is a diagram illustrating a processing sequence of a PWM modulator 370 according to the first embodiment.

FIG. 10 is a diagram illustrating a processing sequence for generating the first PWM signals SupA, SunA, SvpA, SvnA, SwpA, and SwnA of the upper and lower arms of each phase of the first inverter 20 using the PWM modulator 370.

In step f-1, the first three-phase AC voltage commands vuA*, vvA*, and vwA* calculated by the dq-to-abc transformer 350 are acquired. Subsequently, in step f-2, it is determined whether or not the first U-phase AC voltage command vuA* acquired in step f-1 is equal to or higher than the triangular wave carrier Carrier.

If vuA* is equal to or higher than Carrier in step f-2, the PWM signal SunA of the first U-phase lower arm is set to OFF in step f-3, and then, the PWM signal SupA of the first U-phase upper arm is set to ON in step f-4. Otherwise, if vuA* is not equal to or higher than Carrier in step f-2, the PWM signal SupA of the first U-phase upper arm is set to OFF in step f-5, and then, the PWM signal SunA of the first U-phase lower arm is set to ON in step f-6.

In step f-7, it is determined whether or not the first V-phase AC voltage command vvA* acquired in step f-1 is equal to or higher than the triangular wave carrier Carrier. If vvA* is equal to or higher than Carrier, the PWM signal SvnA of the first V-phase lower arm is set to OFF in step f-8, and then, the PWM signal SvpA of the first V-phase upper arm is set to ON in step f-9. Otherwise, if vvA* is not equal to or higher than Carrier, the PWM signal SvpA of the first V-phase upper arm is set to OFF in step f-10, and then, the PWM signal SvnA of the first V-phase lower arm is set to ON in step f-11.

In step f-12, it is determined whether or not the first W-phase AC voltage command vwA* acquired in step f-1 is equal to or higher than the triangular wave carrier Carrier. If vwA* is equal to or higher than Carrier, the PWM signal SwnA of the first W-phase lower arm is set to OFF in step f-13, and then, the PWM signal SwpA of the first W-phase upper arm is set to ON in step f-14. Otherwise, if vwA* is not equal to or higher than Carrier, the PWM signal SwpA of the first W-phase upper arm is set to OFF in step f-15, and then, the PWM signal SwnA of the first W-phase lower arm is set to ON in step f-16.

By generating the PWM signals SupA, SunA, SvpA, SvnA, SwpA, and SwnA of the first upper and lower arms of each phase in this manner, it is possible to allow an average value of the PWM voltage of the UVW-phase output from the first inverter 20 to match the first three-phase AC voltage commands vuA*, vvA*, and vwA*. Such a method of generating the PWM signals is generally known as a triangular wave comparison method. Alternatively, without limiting to the triangular wave comparison method, other methods such as a space vector modulation method may also be employed as the method of generating the PWM signals.

(Operation of Gate Drive Circuit 390)

The gate drive circuit 390 amplifies voltages of the PWM signals SupA to SwnA of the first upper and lower arms of each phase generated by the PWM modulator 370 and inputs the amplified voltages to the gates of the switching elements 30 to 80 of the upper and lower arms of each phase of the first inverter 20.

As a result, the switching elements 30 to 80 of the upper and lower arms of each phase of the first inverter 20 are turned on or off depending on the PWM signals SupA to SwnA of the first upper and lower arms of each phase.

(Processing of Voltage Command Predictor 340)

Figure 11:
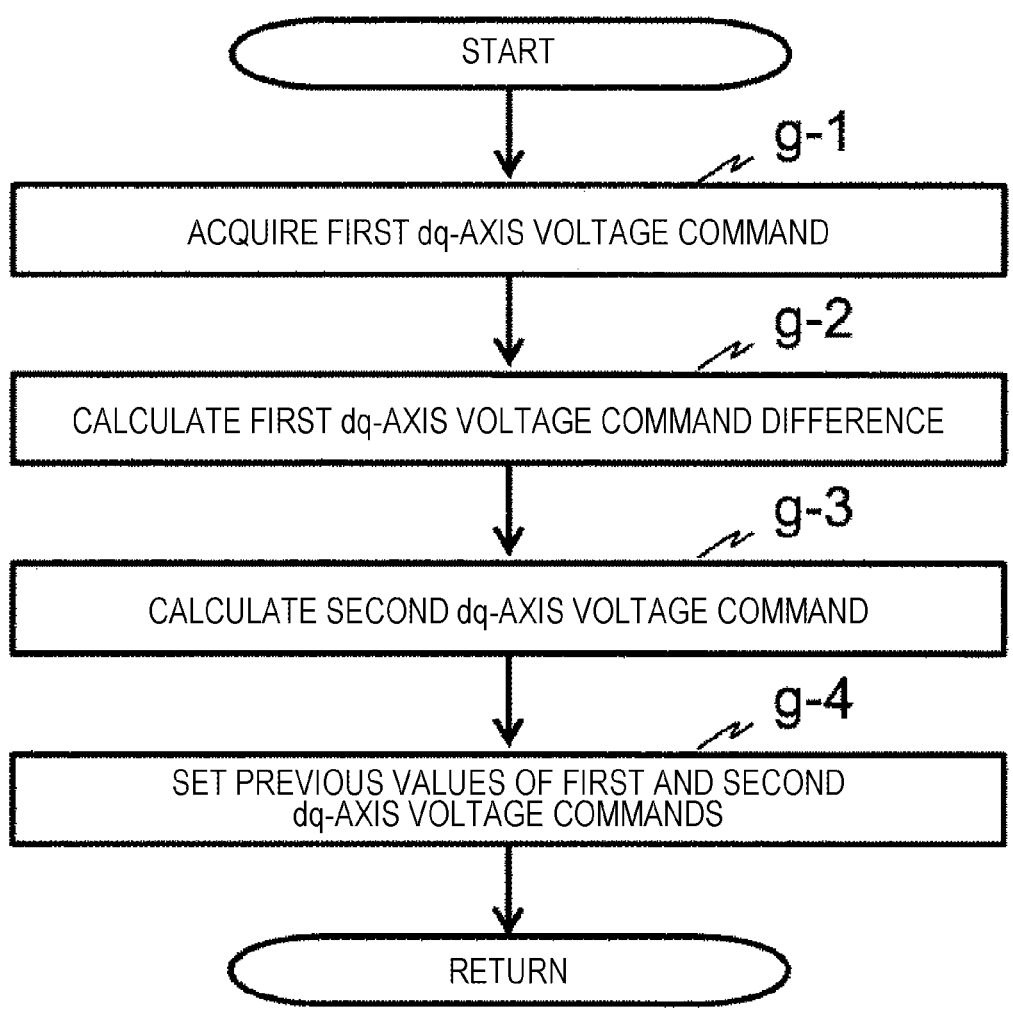
FIG. 11 is a diagram illustrating a processing sequence of a voltage command predictor 340 according to the first embodiment.

FIG. 11 is a diagram illustrating a processing sequence for predicting the second d-axis voltage command vdB* and the second q-axis voltage command vqB* on the basis of the first d-axis voltage command vdA* and the first q-axis voltage command vqA* using the voltage command predictor 340 according to the first embodiment.

In step g-1, the first dq-axis voltage commands vdA* and vqA* calculated by the current controller 320 are acquired. In step g-2, the first dq-axis voltage commands vdA* and vqA* acquired in step g-1 and previous values vdAold* and vqAold* of the first dq-axis voltage commands set in step g-4 described below are applied to Formula (14), so as to calculate the first dq-axis voltage command differences ΔvdA* and ΔvqA*.

[Formula 14]

$$\Delta v^*_{dA} = v^*_{dA} - v^*_{dAold}$$

$$\Delta v^*_{qA} = v^*_{qA} - v^*_{qAold} \tag{14}$$

In step g-3, the first dq-axis voltage command differences ΔvdA* and ΔvqA* calculated in step g-2 and previous values vdBold* and vqBold* of the second dq-axis voltage commands set in step g-4 described below are applied to Formula (15), so as to generate the second dq-axis voltage commands vdB* and vqB*.

[Formula 15]

$$v^*_{dB} = v^*_{dBold} + \Delta v^*_{dA}$$

$$v^*_{qB} = v^*_{qBold} + \Delta v^*_{qA} \tag{15}$$

In step g-4, the first dq-axis voltage commands vdA* and vqA* acquired in step g-1 and the second dq-axis voltage commands vdB* and vqB* generated in step g-3 are applied to Formula (16), so as to set the previous values vdAold* and vqAold* of the first dq-axis voltage commands and the previous values vdBold* and vqBold* of the second dq-axis voltage commands.

[Formula 16]

$$v^*_{dAold} = v^*_{dA}$$

$$v^*_{qAold} = v^*_{qA}$$

$$v^*_{dBold} = v^*_{dB}$$

$$v^*_{qBold} = v^*_{qB} \tag{16}$$

By generating the second dq-axis voltage commands vdB* and vqB* in this manner, it is possible to remarkably reduce processing loads for a current detection process, a three-phase AC current calculation process, an abc-to-dq transformation process, and a current control process, compared to a method of detecting the DC bus currents of all channels and generating the voltage commands of the inverters of all channels using a current control such as a proportional component control. That is, it is possible to reduce a computation amount for controlling the second inverter 120 and the motor 110.

According to the first embodiment, as a configuration of the voltage command predictor 340, the first dq-axis voltage command differences ΔvdA* and ΔvqA* are directly added to the previous values vdBold* and vqBold* of the second dq-axis voltage commands as expressed in Formula (15). Alternatively, for example, by multiplying ΔvdA* and ΔvqA* by a predetermined coefficient and then adding them to vdBold* and vqBold*, a difference of the circuit parameter or the like between the first and second inverters 20 and 120 may be compensated.

Alternatively, the voltage command predictor 340 may be configured, for example, using a method of calculating the second dq-axis voltage commands vdB* and vqB* by obtaining a ratio between the first dq-axis voltage commands vdA* and vqA* and the previous values vdAold* and vqAold* of the first dq-axis voltage commands and multiplying this ratio by the previous values vdBold* and vqBold* of the second dq-axis voltage commands. Such a method does not depart from the subject matter of the invention, that is, the voltage command value of the second inverter is generated on the basis of a variation of the voltage command value of the first inverter.

(Processing of dq-to-abc Transformer 360)

Figure 12:
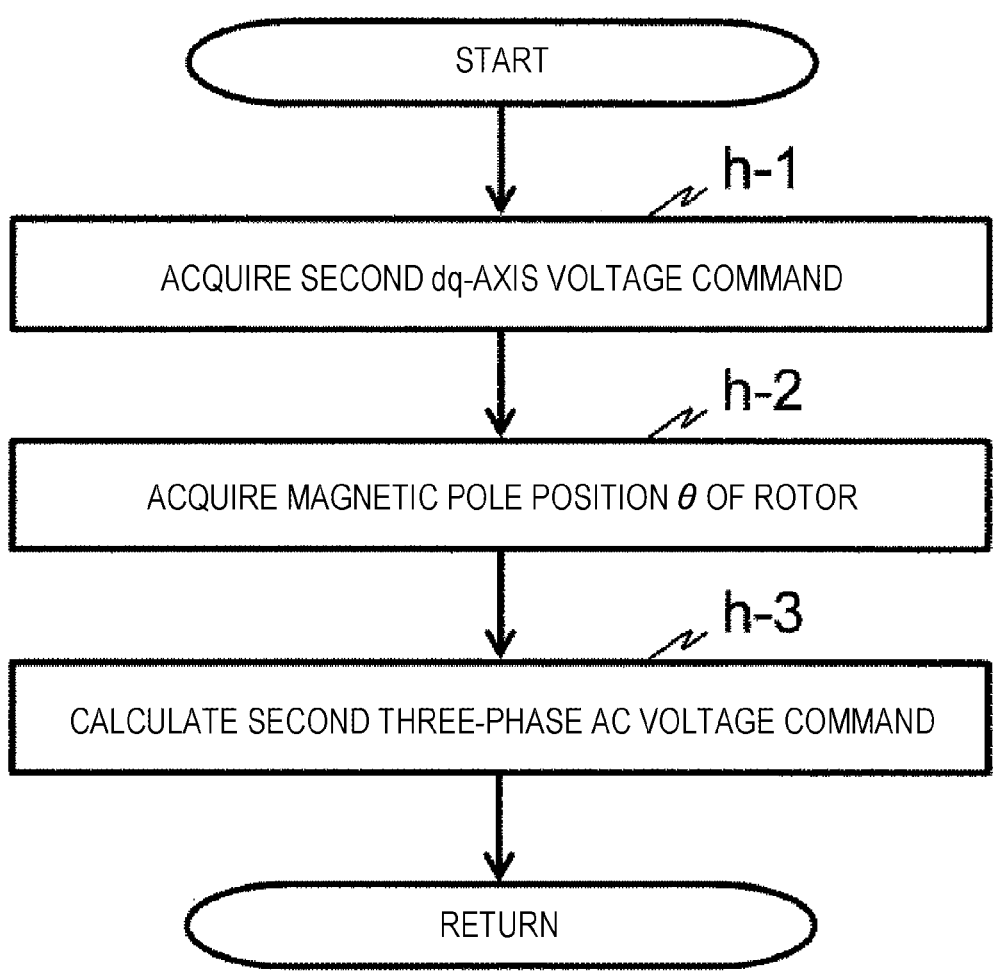
FIG. 12 is a diagram illustrating a processing sequence of a dq-to-abc transformer 360.

FIG. 12 is a diagram illustrating a processing sequence for generating the second three-phase AC voltage commands vuB*, vvB*, and vwB* on the basis of the second d-axis voltage command vdB* and the second q-axis voltage command vqB* using the dq-to-abc transformer 360. A basic operation is similar to the operation of the dq-to-abc transformer 350 of FIG. 9. That is, the second dq-axis voltage commands vdB* and vqB* acquired in step h-1 and the magnetic pole position θ of the rotor of the motor 110 acquired in step h-2 are applied to Formula (17), so as to calculate the second three-phase AC voltage commands vuB*, vvB*, and vwB*.

[Formula 17]

$$\begin{bmatrix} v_{uB}^* \\ v_{vB}^* \\ v_{wB}^* \end{bmatrix} = \begin{bmatrix} \cos\theta & -\sin\theta \\ \cos(\theta - \frac{2}{3}\pi) & -\sin(\theta - \frac{2}{3}\pi) \\ \cos(\theta + \frac{2}{3}\pi) & -\sin(\theta + \frac{2}{3}\pi) \end{bmatrix} \begin{bmatrix} v_{dB}^* \\ v_{qB}^* \end{bmatrix} \quad (17)$$

(Processing of PWM Modulator 380)

Figure 13:
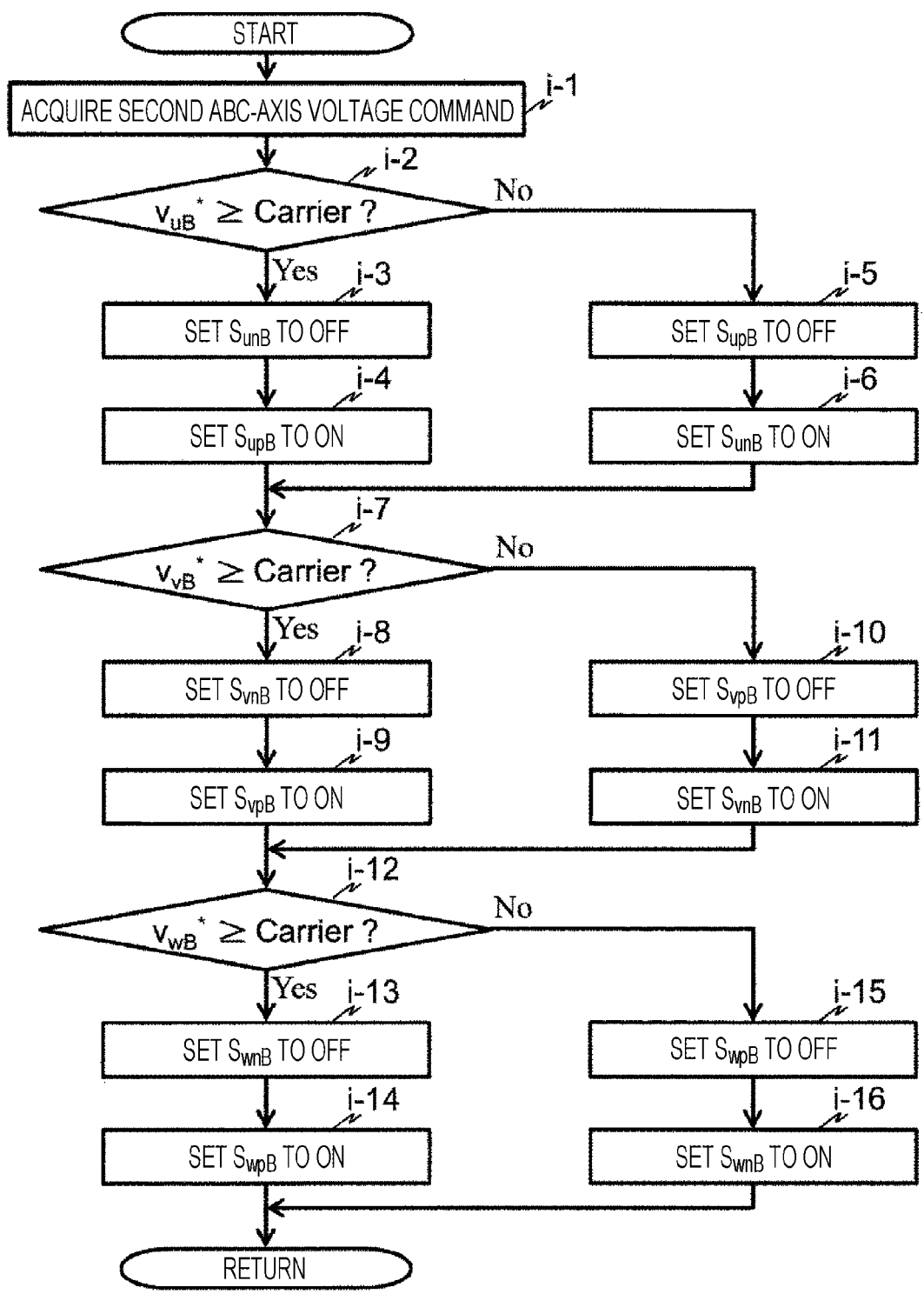
FIG. 13 is a diagram illustrating a processing sequence of the PWM modulator 380 according to the first embodiment.

FIG. 13 is a diagram illustrating a processing sequence for generating the second PWM signals SupB, SunB, SvpB, SvnB, SwpB, and SwnB of the upper and lower arms of each phase of the second inverter 20 using the PWM modulator 380. A basic concept is similar to that of FIG. 10, and it will not be described in details here.

(Operation of Gate Drive Circuit 400)

The gate drive circuit 400 amplifies voltages of the PWM signals SupB to SwnB of the second upper and lower arms of each phase generated by the PWM modulator 380 and inputs the amplified voltages to the gates of switching elements 130 to 180 of the upper and lower arms of each phase of the second inverter 120.

As a result, the switching elements 130 to 180 of the upper and lower arms of each phase of the second inverter 120 are turned on or off depending on the PWM signals SupB to SwnB of the second upper and lower arms of each phase.

Second Embodiment (Overview of Electric Power Steering Apparatus)

Figure 14A:
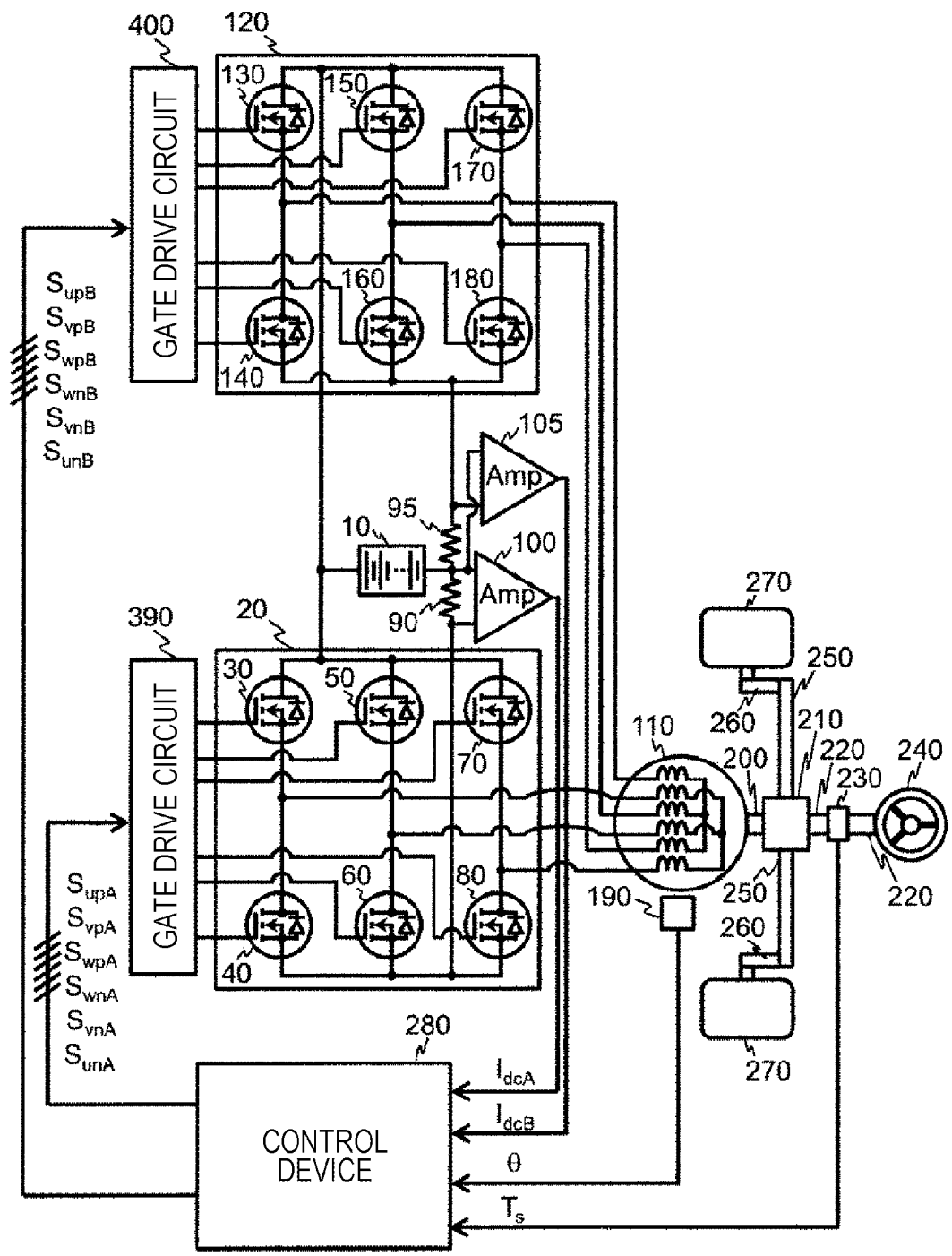
FIG. 14(a) is a diagram illustrating an electric power steering apparatus according to a second embodiment.

FIG. 14(a) is a diagram illustrating an electric power steering apparatus according to the second embodiment.

The electric power steering apparatus according to the second embodiment has a configuration different from that of the first embodiment as described below. The electric power steering apparatus according to the second embodiment has a shunt resistance 95 for detecting a DC bus current IdcB (hereinafter, referred to as a "second DC bus current IdcB") of the second inverter 120 and an amplifier 105 for amplifying a voltage between both ends of the shunt resistance 95. The control device 280 receives first and second DC bus currents IdcA and IdcB. In addition, as described below in conjunction with FIG. 14(b), the control device 280 according to the second embodiment has a detection current selector 285 that selects any one of the first and second DC bus current IdcA and IdcB as a detection current and an abnormality detector 295. By virtue of such additional parts, it is possible to detect any abnormality such as a ground fault or overcurrent in each channel with high accuracy and enhance a failsafe functionality.

In the electric power steering apparatus according to the second embodiment, the DC bus currents of each channel are sequentially switchingly detected. The voltage command of the inverter of the channel where the DC bus current is detected is generated through a current control such as the proportional plus integral control. The voltage command of the inverter of the channel where the DC bus current is not detected is generated by adding a difference between the previous value and the latest value of the voltage command of the inverter where the DC bus current is detected to the voltage command prior to one computation cycle of the inverter of the channel where the DC bus current is not detected.

By generating the voltage command of the inverter of each channel in this manner, it is possible to remarkably reduce processing loads for a current detection process, a three-phase AC current calculation process, an abc-to-dq transformation process, and a current control process, compared to a method of detecting the DC bus currents of all channels and generating the voltage commands of the inverters of all channels using a typical current control such as a proportional plus integral control.

(Processing of Control Device 280)

Figure 14B:
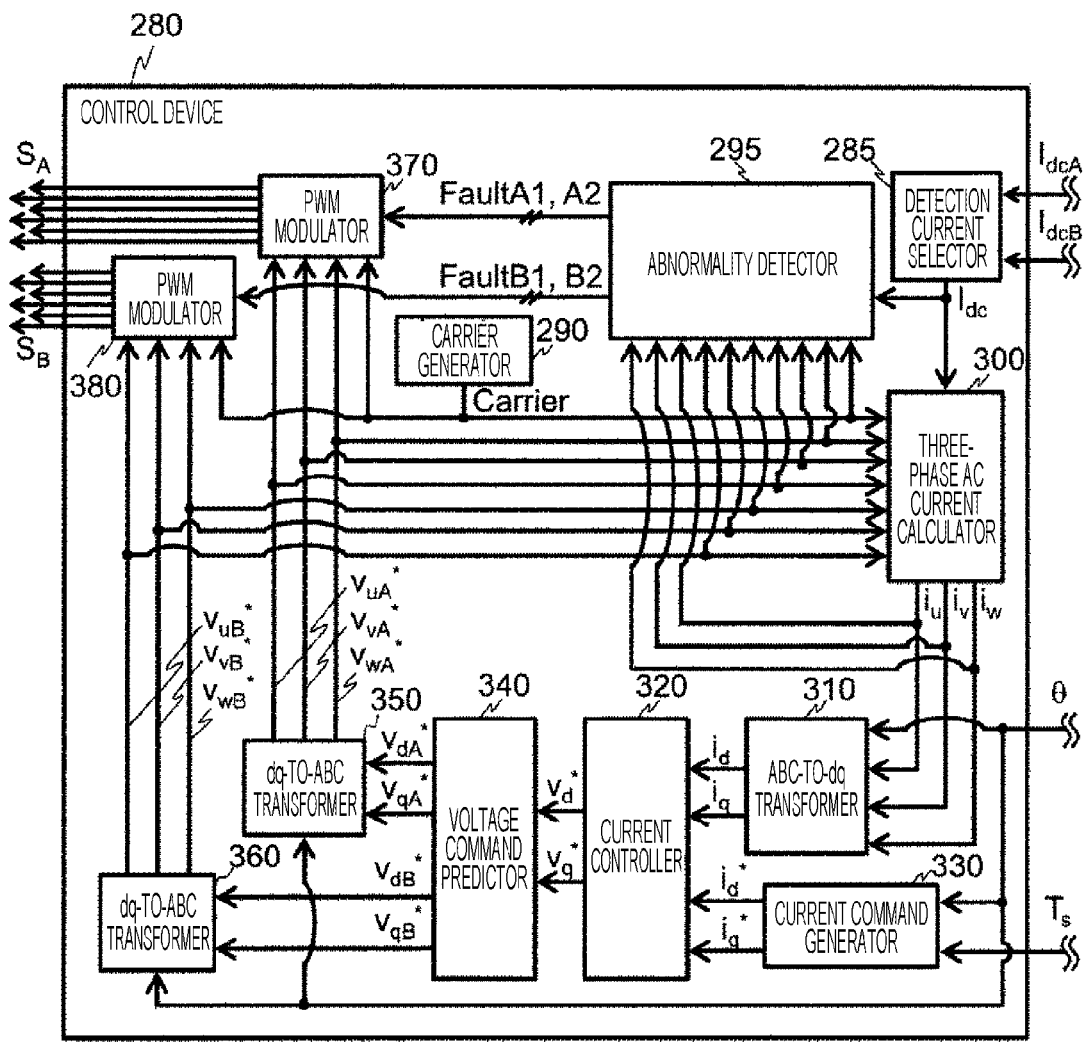
FIG. 14(b) is a diagram illustrating a configuration of a control device 280 according to the second embodiment.

A configuration and processing details of the control device 280 according to the second embodiment will be described with reference to FIG. 14(b). The control device 280 includes a detection current selector 285, a carrier generator 290, an abnormality detector 295, a three-phase AC current calculator 300, an abc-to-dq transformer 310, a current controller 320, a current command generator 330, a voltage command predictor 340, dq-to-abc transformers 350 and 360, and PWM modulators 370 and 380.

The detection current selector 285 selects any one of the first and second DC bus currents IdcA and IdcB as a detection current. Here, it is assumed that the detection current selector 285 sequentially switchingly selects the first and second DC bus currents IdcA and IdcB at every predetermined timing.

When the detection current selector 285 selects the first DC bus current IdcA, the three-phase AC current calculator 300 acquires the first DC bus current IdcA at a timing determined on the basis of a relationship between the triangular wave carrier Carrier and the first three-phase AC voltage commands vuA*, vvA*, and vwA*. The three-phase AC current calculator 300 calculates the first three-phase AC currents iuA, ivA, and iwA flowing to the first three-phase coil of the motor 110 on the basis of the acquired first DC bus current IdcA. In addition, the three-phase AC current calculator 300 sets the calculated first three-phase AC currents iuA, ivA, and iwA as the three-phase AC currents iu, iv, and iw for a single channel.

In this case, the abnormality detector 295 acquires the first DC bus current IdcA and the three-phase AC currents iu, iv, and iw for a single channel (that is, the first three-phase AC currents iuA, ivA, and iwA) calculated by the three-phase AC current calculator 300 at the timing determined on the basis of a relationship between the triangular wave carrier Carrier and the first three-phase AC voltage commands vuA*, vvA*, and vwA*. The abnormality detector 295 determines whether or not there is an abnormality (such as a ground fault or overcurrent) in the channel including the first inverter 20 and the motor 110 on the basis of the acquired first DC bus current IdcA and first three-phase AC currents iuA, ivA, and iwA.

Meanwhile, when the detection current selector 285 selects the second DC bus current IdcB, the three-phase AC current calculator 300 acquires the second DC bus current IdcB at the timing determined on the basis of a relationship between the triangular wave carrier Carrier and the second three-phase AC voltage commands vuB*, vvB*, and vwB*. The three-phase AC current calculator 300 calculates the second three-phase AC currents iuB, ivB, and iwB flowing to the second three-phase coil of the motor 110 on the basis of the acquired second DC bus current IdcB. In addition, the three-phase AC current calculator 300 sets the calculated second three-phase AC currents iuB, ivB, and iwB as the three-phase AC currents iu, iv, and iw for a single channel.

In this case, the abnormality detector 295 acquires the second DC bus current IdcB and the three-phase AC currents iu, iv, and iw for a single channel (that is, the second three-phase AC currents iuB, ivB, and iwB) calculated by the three-phase AC current calculator 300 at the timing determined on the basis of a relationship between the triangular wave carrier Carrier and the second three-phase AC voltage commands vuB*, vvB*, and vwB*. The abnormality detector 295 determines whether or not there is an abnormality (such as a ground fault or overcurrent) in the channel including the second inverter 120 and the motor 110 on the basis of the acquired second DC bus current IdcB and second three-phase AC currents iuB, ivB, and iwB.

The abc-to-dq transformer 310 calculates the d-axis current id flowing to the d-axis and the q-axis current iq flowing to the q-axis for a single channel of the motor 110 on the basis of the three-phase AC currents iu, iv, and iw for a single channel and the magnetic pole position θ of the rotor of the motor 110.

The current command generator 330 generates the d-axis current command id* and the q-axis current command iq* for a single channel of the motor 110 on the basis of the magnetic pole position θ and the torque Ts of the rotor of the motor 110.

The current controller 320 generates the d-axis voltage command vd* and the q-axis voltage command vq* for a single channel such that the d-axis current id and the q-axis current iq for a single channel match the d-axis current command id* and the q-axis current command iq* for a single channel.

When the detection current selector 285 selects the first DC bus current IdcA, the voltage command predictor 340 sets the dq-axis voltage commands vd* and vq* for a single channel as the first dq-axis voltage commands vdA* and vqA* and calculates the second dq-axis voltage commands vdB* and vqB* by adding the differences ΔvdA* and ΔvqA* between the latest first dq-axis voltage commands vdA* and vqA* and the first dq-axis voltage commands vdAold* and vqAold* prior to a single computation cycle to the second dq-axis voltage commands vdBold* and vqBold* prior to a single computation cycle.

Meanwhile, when the detection current selector 285 selects the second DC bus current IdcB, the voltage command predictor 340 sets the dq-axis voltage commands vd* and vq* for a single channel as the second dq-axis voltage commands vdB* and vqB* and calculates the first dq-axis voltage commands vdA* and vqA* by adding the differences ΔvdB* and ΔvqB* between the latest second dq-axis voltage commands vdB* and vqB* and the second dq-axis voltage commands vdBold* and vqBold* prior to a single computation cycle to the first dq-axis voltage commands vdAold* and vqAold* prior to a single computation cycle.

The dq-to-abc transformer 350 calculates the first three-phase AC voltage command vuA*, vvA*, and vwA* on the basis of the first d-axis voltage command vdA*, the first q-axis voltage command vqA*, and the magnetic pole position θ of the rotor of the motor 110. The PWM modulator 370 generates the first PWM signals SupA, SunA, SvpA, SvnA, SwpA, and SwnA of the upper and lower arms of each phase of the first inverter 20 on the basis of the first three-phase AC voltage commands vuA*, vvA*, and vwA*, the triangular wave carrier Carrier, and a first ground fault determination flag FaultA1 and a first overcurrent determination flag FaultA2 generated by the abnormality detector 295.

The dq-to-abc transformer 360 calculates the second three-phase AC voltage commands vuB*, vvB*, and vwB* on the basis of the second d-axis voltage command vdB*, the second q-axis voltage command vqB*, and the magnetic pole position θ of the rotor of the motor 110. The PWM modulator 380 generates the second PWM signals SupB, SunB, SvpB, SvnB, SwpB, and SwnB of the upper and lower arms of each phase of the second inverter 120 on the basis of the second three-phase AC voltage commands vuB*, vvB*, and vwB*, the triangular wave carrier Carrier, and a second ground fault determination flag FaultB1 and a second overcurrent determination flag FaultB2 generated by the abnormality detector 295.

The carrier generator 290, the abc-to-dq transformer 310, the current command generator 330, the current controller 320, and the dq-to-abc transformers 350 and 360 are similar to those of the first embodiment, and they will not be described in details repeatedly.

(Processing of Detection Current Selector 285)

As described above, the detection current selector 285 sequentially switchingly selects any one of the first DC bus current IdcA and the second DC bus current IdcB at a predetermined timing. In addition, the detection current selector 285 sets any one of the first DC bus current IdcA and the second DC bus current IdcB as the DC bus current Idc for a single channel.

Here, the timing for switching selection between the first DC bus current IdcA and the second DC bus current IdcB may be set to a predetermined time interval. Preferably, the timing for switching selection is set to a period of time in which all of the upper arms of each phase of the inverters are turned on, and all of the lower arms of each phase are turned off, or a period of time in which all of the lower arms of each phase are turned on, and all of the upper arms of each phase are turned off.

(Processing of Three-Phase AC Current Calculator 300)

Figure 15:
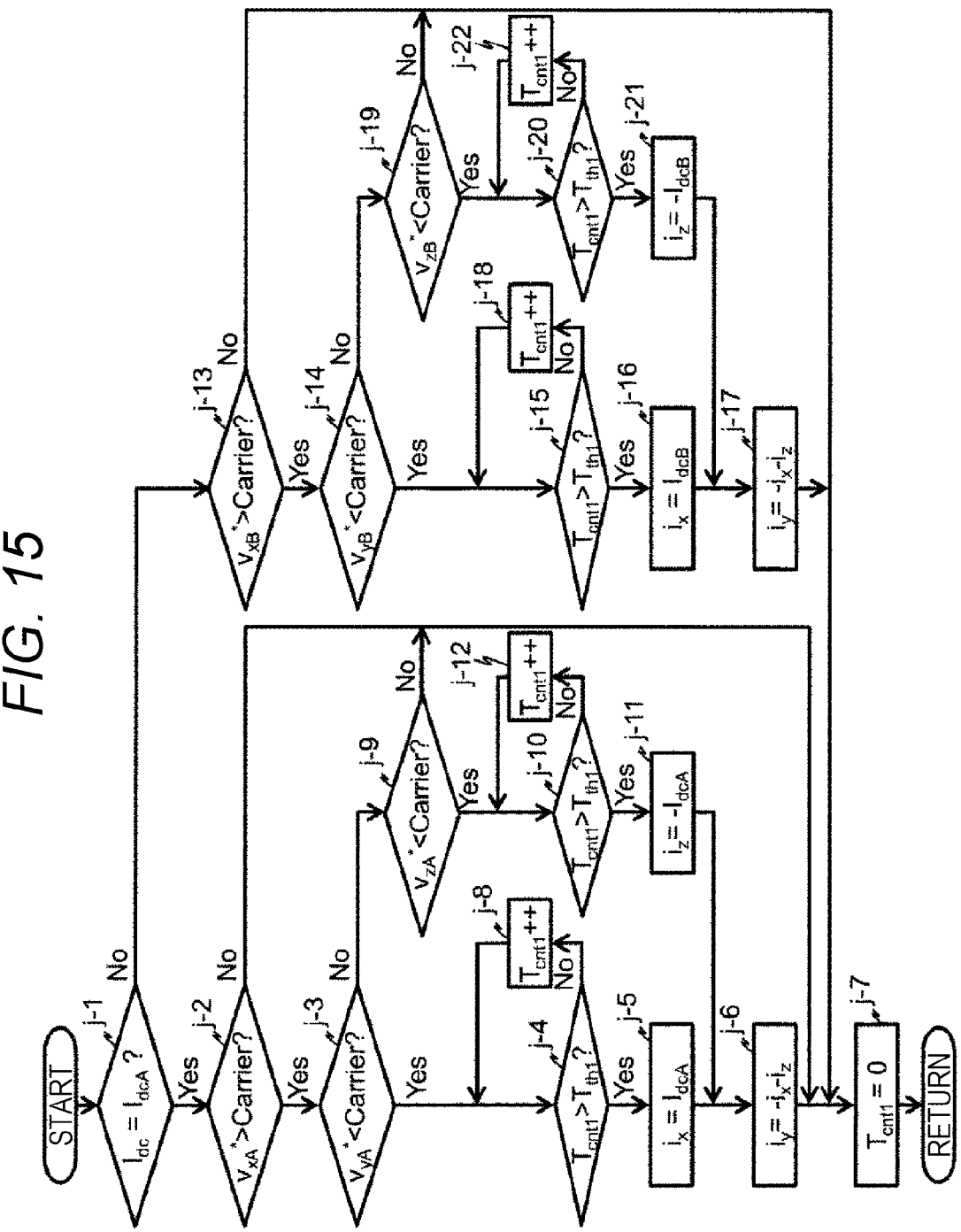
FIG. 15 is a diagram illustrating a processing sequence of a three-phase AC current calculator 300 according to the second embodiment.

FIG. 15 is a diagram illustrating a processing sequence of the three-phase AC current calculator 300 according to the second embodiment. As described above, the three-phase AC current calculator 300 calculates the three-phase AC currents iu, iv, and iw for a single channel on the basis of any one of the first DC bus current IdcA and the second DC bus current IdcB.

In FIG. 15, similarly to FIG. 2, the subscripts corresponding to the maximum phase, the intermediate phase, and the minimum phase are denoted by "x, y, and z".

In step j-1, the three-phase AC current calculator 300 determines whether or not the detection current selector 285 selects the first DC bus current IdcA.

When the detection current selector 285 selects the first DC bus current IdcA, through the processing of steps j-2 to j-12, the first three-phase AC currents iuA, ivA, and iwA are set as the three-phase AC currents iu, iv, and iw for a single channel. A processing for this case is substantially similar to the processing described above in conjunction with FIG. 2 in the first embodiment, and it will not be described in details repeatedly. However, Formulas (1), (2), and (3) are substituted with Formulas (18), (19), and (20).

[Formula 18]

$$i_x = i_{dcA} \quad (18)$$

[Formula 19]

$$i_y = -i_x - i_z \quad (19)$$

[Formula 20]

$$i_z = -I_{dcA} \quad (20)$$

Meanwhile, if the detection current selector 285 selects the second DC bus current IdcA in step j-1, the second three-phase AC currents iuB, ivB, and iwB are set as the three-phase AC currents iu, iv, and iw for a single channel through the processing of steps j-13 to j-22. The processing in this case is also similar to the processing sequence described above in conjunction with FIG. 2 in the first embodiment, and they will not be described in details repeatedly. However, Formulas (1), (2), and (3) are substituted with Formulas (21), (19), and (22).

[Formula 21]

$$i_x = I_{dcB} \quad (21)$$

[Formula 22]

$$i_z = -I_{dcB} \quad (22)$$

By calculating the three-phase AC currents in this manner, it is possible to calculate the three-phase AC currents iuA, ivA, and iwA flowing to the first three-phase coil when the detection current selector 285 selects the first DC bus current IdcA. In addition, when the detection current selector 285 selects the second DC bus current IdcB, it is possible to calculate the three-phase AC currents iuB, ivB, and iwB flowing to the second three-phase coil.

A relationship between the PWM signals of the upper arm of each phase generated by comparison between the three-phase AC voltage command and the carrier, the three-phase AC current, and the DC bus current is similar to that of FIG. 3, and it will not be described repeatedly. In addition, the current paths of the three-phase AC current and the DC bus current corresponding to the switch mode of the inverter are similar to those of FIG. 4, and they will not be described repeatedly.

(Processing of Abnormality Detector 295)

Figure 16:
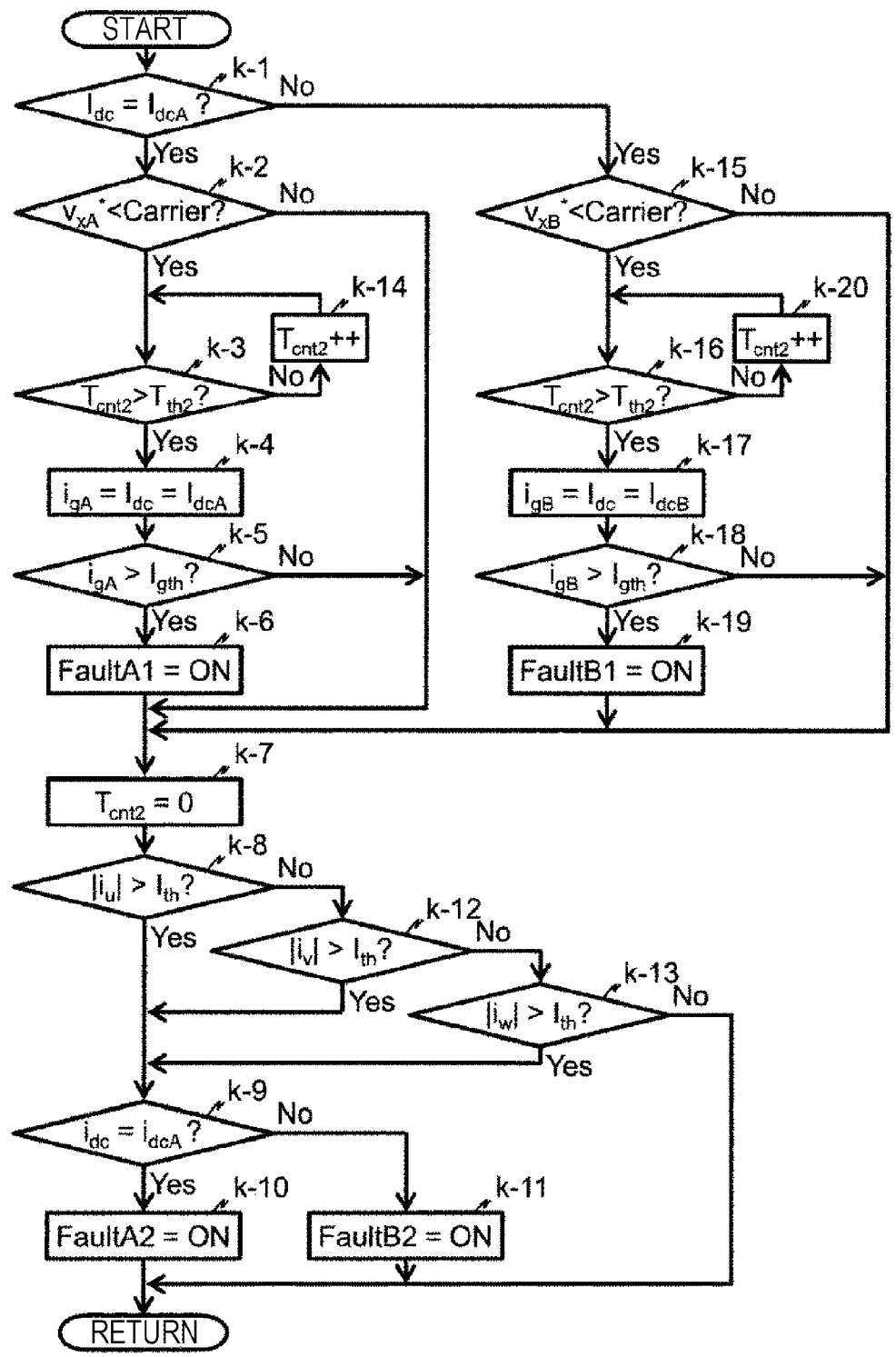
FIG. 16 is a diagram illustrating a processing sequence of an abnormality detector 295 according to the second embodiment.

FIG. 16 is a diagram illustrating a processing sequence for determining whether or not there is an abnormality (such as a ground fault or overcurrent) in the channel on the basis of the DC bus current and the three-phase AC current using the abnormality detector 295.

The abnormality detector 295 determines in step k-1 whether or not the detection current selector 285 selects the first DC bus current IdcA.

When the detection current selector 285 selects the first DC bus current IdcA in step k-1, it is determined in step k-2 whether or not the first X-phase AC voltage command vxA* (first maximum phase voltage command) is lower than the triangular wave carrier Carrier. If vxA* is lower than Carrier, the process advances to step k-3. If vxA* is not lower than Carrier, the process advances to step k-7.

In step k-3, it is determined whether or not the second timer counter value Tcnt2 is greater than a predetermined threshold value Tth2. If Tcnt2 is not greater than Tth2, Tcnt2 is counted up in step k-14, and then, step k-3 is repeated. If Tcnt2 is greater than Tth2, the detected first DC bus current IdcA is applied to Formula (23) in step k-4 to calculate the first ground current igA. Expression of the first ground current igA in Formula (23) will be described below with reference to FIG. 17.

[Formula 23]

$$i_{gA} = I_{dc} = I_{dcA} \quad (23)$$

Then, in step k-5, it is determined whether or not the first ground current igA is larger than a predetermined threshold value Igth. If the first ground current igA is larger than Igth, the first ground fault determination flag FaultA1 is set to ON (occurrence of a ground fault) in step k-6, and the process advances to step k-7. If igA is not larger than Igth, the process advances to step k-7 without executing step k-6.

Meanwhile, if the detection current selector 285 does not select the first DC bus current IdcA in step k-1, instead of steps k-2 to k-6, steps k-15 to k-19 are processed, so that it is determined whether or not a ground fault occurs in the inverter of the second channel. Here, the second ground current igB is calculated on the basis of Formula (24).

[Formula 24]

$$i_{gB} = I_{dc} = I_{dcB} \quad (24)$$

In step k-7, the second timer counter value Tcnt2 is reset to zero.

Subsequently, the abnormality detector 295 determines whether or not overcurrent occurs in steps k-8 to k-13.

In step k-8, it is determined whether or not an absolute value |iu| of the U-phase AC current iu calculated by the three-phase AC current calculator 300 is larger than a predetermined threshold value Ith. If |iu| is not larger than the predetermined threshold value Ith, it is determined whether or not the absolute value |iv| of the V-phase AC current iv is larger than the predetermined threshold value Ith in step k-12. If |iv| is not larger than the predetermined threshold value Ith, it is determined in step k-13 whether or not the absolute value |iw| of the W-phase AC current iw is larger than the predetermined threshold value Ith.

If it is determined in steps k-8, k-12, and k-13 that any one of |iu|, |iv|, and |iw| is larger than the predetermined threshold value Ith, it is determined in step k-9 whether or not the detection current selector 285 selects the first DC bus current IdcA. In addition, if the detection current selector 285 selects the first DC bus current IdcA, the first overcurrent determination flag FaultA2 is set to ON (occurrence of overcurrent) in step k-10. If the detection current selector 285 does not select the first DC bus current IdcA, the second overcurrent determination flag FaultB2 is set to ON (occurrence of overcurrent) in step k-11.

By determining an abnormality (such as a ground fault or overcurrent) in this manner, it is possible to specify whether or not an abnormality occurs in the channel including the first inverter 20 and the first three-phase coil, or whether or not an abnormality occurs in the channel including the second inverter 120 and the second three-phase coil.

Alternatively, although the abnormality detector 295 according to the second embodiment is configured to determine occurrence of a ground fault and overcurrent, occurrence of only one of a ground fault and overcurrent may be determined.

Figure 17:
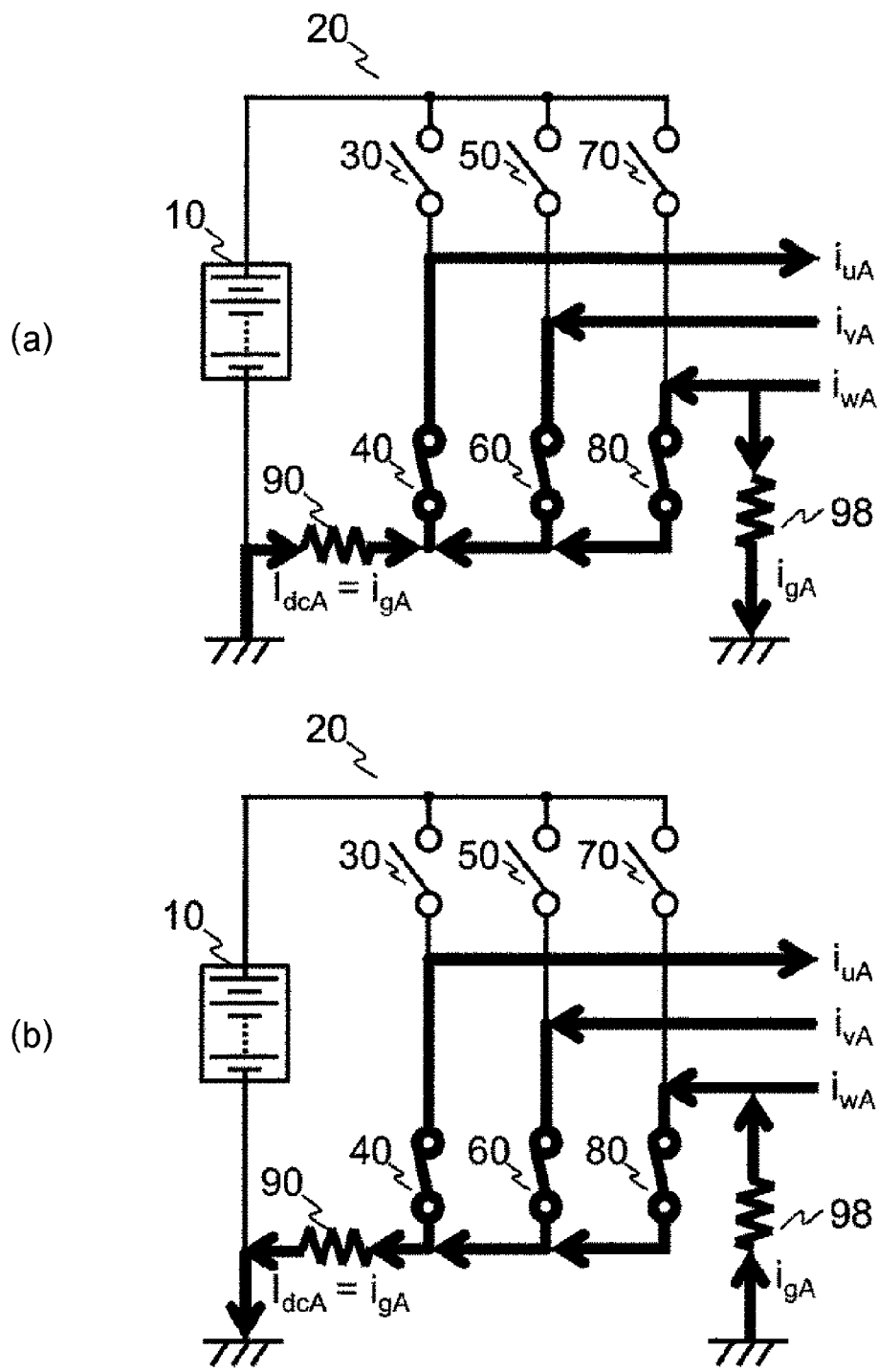
FIG. 17 is a diagram illustrating a relationship between a first DC bus current IdcA and a first ground current igA.

FIG. 17 is a diagram illustrating a relationship between the first DC bus current IdcA and the first ground current igA detected by setting all of upper arms of each phase to OFF and setting all of lower arms of each phase to ON when a ground fault occurs between the W-phase and the earth in the channel including the first inverter 20 and the first three-phase coil.

FIG. 17(a) illustrates a mode in which the first ground current igA flows from the W-phase to the earth side. FIG. 17 (b) illustrates a mode in which the first ground current igA flows from the earth to the W-phase side. When no ground fault occurs, as described in conjunction with FIG. 4(d), no current flows to the shunt resistance 90. However, if a ground fault occurs, a ground current igA flows to the shunt resistance 90 and a ground fault resistance 98 as illustrated in FIG. 17. Therefore, the first DC bus current IdcA detected when all of the upper arms of each phase are set to OFF, and all of the lower arms of each phase are set to OFF is the first ground current igA, and the relationship expressed in Formula (23) described above is established.

A ground fault occurring in the channel including the second inverter 120 and the second three-phase coil is similar to that occurring in the channel including the first inverter 20 and the first three-phase coil as described above, and it will not be described repeatedly.

(Processing of Voltage Command Predictor 340)

Figure 18:
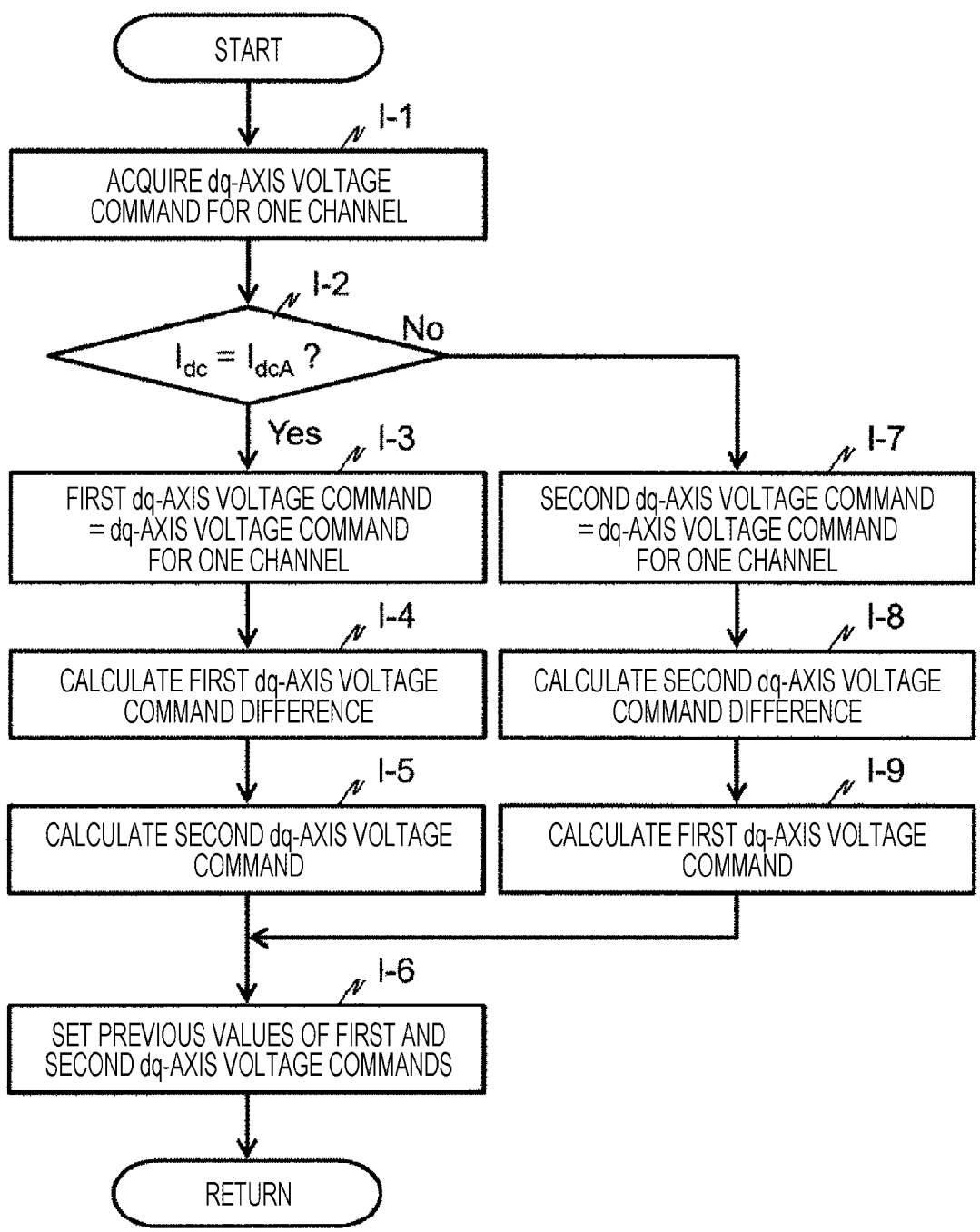
FIG. 18 is a diagram illustrating a processing sequence of a voltage command predictor 340 according to the second embodiment.

FIG. 18 is a diagram illustrating a processing sequence for calculating the first dq-axis voltage commands vdA* and vqA* and the second dq-axis voltage commands vdB* and vqB* using the voltage command predictor 340 according to the second embodiment.

The voltage command predictor 340 acquires the dq-axis voltage commands vd* and vq* for a single channel calculated by the current controller 320 in step 1-1. In addition, in step 1-2, it is determined whether or not the detection current selector 285 selects the first DC bus current IdcA.

If it is determined in step 1-2 that the detection current selector 285 selects the first DC bus current IdcA, the dq-axis voltage commands vd* and vq* for a single channel acquired in step 1-1 are set as the first dq-axis voltage commands vdA* and vqA* on the basis of Formula (25) in step 1-3.

[Formula 25]

$$v^*_{dA}=v^*_d$$

$$v^*_{qA}=v^*_q \tag{25}$$

Then, in step 1-4, the first dq-axis voltage commands vdA* and vqA* and previous values vdAold* and vqAold* of the first dq-axis voltage command set in step 1-6 described below are applied to Formula (14), so as to calculate the first dq-axis voltage command differences ΔvdA* and ΔvqA*. In addition, in step 1-5, the first dq-axis voltage command differences ΔvdA* and ΔvqA* and the previous values vdBold* and vqBold* of the second dq-axis voltage command set in step 1-6 described below are applied to Formula (15), so as to generate the second dq-axis voltage commands vdB* and vqB*.

In step 1-6, the voltage command predictor 340 applies the first dq-axis voltage commands vdA* and vqA* calculated in step 1-3 and the second dq-axis voltage commands vdB* and vqB* generated in step 1-5 to Formula (16) to set previous values vdAold* and vqAold* of the first dq-axis voltage command and previous values vdBold* and vqBold* of the second dq-axis voltage command.

Meanwhile, if it is determined in step 1-2 that the detection current selector 285 does not select the first DC bus current IdcA, the dq-axis voltage commands vd* and vq* for a single channel acquired in step 1-1 are set as the second dq-axis voltage commands vdB* and vqB* on the basis of Formula (26) in step 1-7.

[Formula 26]

$$v^*_{dB}=v^*_d$$

$$v^*_{qB}=v^*_q \tag{26}$$

Then, in step 1-8, the second dq-axis voltage commands vdB* and vqB* and the previous values vdBold* and vqBold* of the second dq-axis voltage command set in step 1-6 are applied to Formula (27), so as to calculate the second dq-axis voltage command differences ΔvdB* and ΔvqB*.

[Formula 27]

$$\Delta v^*_{dB}=v^*_{dB}-v^*_{dBold}$$

$$\Delta v^*_{qB}=v^*_{qB}-v^*_{qBold} \tag{27}$$

In step 1-9, the second dq-axis voltage command differences ΔvdB* and ΔvqB* and the previous values vdAold* and vqAold* of the first dq-axis voltage command set in step 1-6 are applied to Formula (28) to generate the first dq-axis voltage commands vdA* and vqA*.

[Formula 28]

$$\Delta v^*_{dA}=v^*_{dAold}+v^*_{dB}$$

$$\Delta v^*_{qA}=v^*_{qAold}+v^*_{qB} \tag{27}$$

In step 1-6, the voltage command predictor 340 applies the second dq-axis voltage commands vdB* and vqB* calculated in step 1-7 and the first dq-axis voltage commands vdA* and vqA* generated in step 1-9 to Formula (16) to set the previous values vdAold* and vqAold* of the first dq-axis voltage command and the previous values vdBold* and vqBold* of the second dq-axis voltage command.

By generating the first dq-axis voltage commands vdA* and vqA*, and the second dq-axis voltage commands vdB* and vqB* in this manner, it is possible remarkably reduce processing loads for a current detection process, a three-phase AC current calculation process, an abc-to-dq transformation process, and a current control process, compared to a method of simultaneously detecting the DC bus currents of all channels and generating the voltage commands of the inverters of all channels using a current control such as a proportional component control. That is, it is possible to reduce a computation amount for controlling the first inverter 20, the second inverter 120, and the motor 110.

(Processing of PWM Modulator 370)

Figure 19:
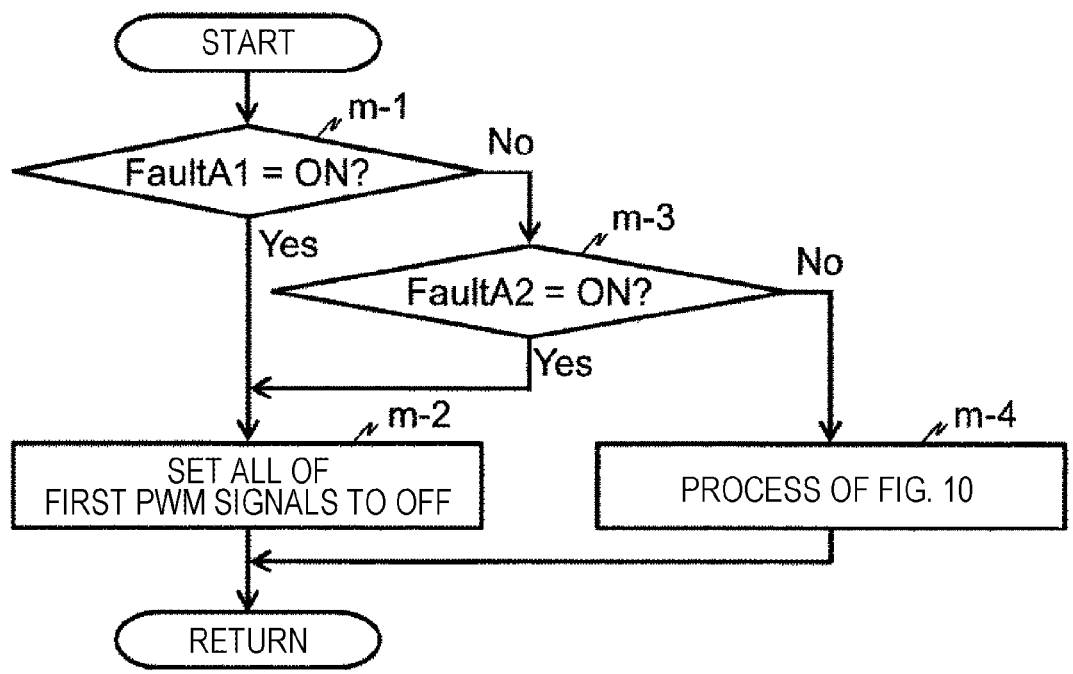
FIG. 19 is a diagram illustrating a processing sequence of the PWM modulator 370 according to the second embodiment.

FIG. 19 is a diagram illustrating a processing sequence of the PWM modulator 370 according to the second embodiment.

The PWM modulator 370 determines in step m-1 whether or not the first ground fault determination flag FaultA1 generated by the abnormality detector 295 is set to ON (occurrence of a ground fault). If the first ground fault determination flag FaultA1 is not set to ON (occurrence of a ground fault), it is determined in step m-3 whether or not the first overcurrent determination flag FaultA2 generated by the abnormality detector 295 is set to ON (occurrence of overcurrent).

If the first ground fault determination flag FaultA1 is set to ON (occurrence of a ground fault) in step m-1, or if the first overcurrent determination flag FaultA2 is set to ON (occurrence of overcurrent) in step m-3, the PWM modulator 370 sets all of the first PWM signals SupA, SunA, SvpA, SvnA, SwpA, and SwnA to OFF in step m-2.

Meanwhile, if the first overcurrent determination flag FaultA2 is not set to ON (occurrence of overcurrent) in step m-3, the PWM modulator 370 processes steps f-1 to f-16 of FIG. 10 in step m-4.

By generating the first PWM signals SupA, SunA, SvpA, SvnA, SwpA, and SwnA in this manner, it is possible to stop switching (maintain OFF states) of the switching elements of the upper and lower arms of each phase of the first inverter 20 when the first ground fault determination flag FaultA1 is set to ON, or the first overcurrent determination flag FaultA2 is set to ON. Meanwhile, when both the first ground fault determination flag FaultA1 and the first overcurrent determination flag FaultA2 are set to OFF, an average value of the PWM voltage of the UVW-phase output from the first inverter 20 can be set to match the first three-phase AC voltage commands vuA*, vvA*, and vwA*.

(Processing of PWM Modulator 380 of Second Embodiment)

Figure 20:
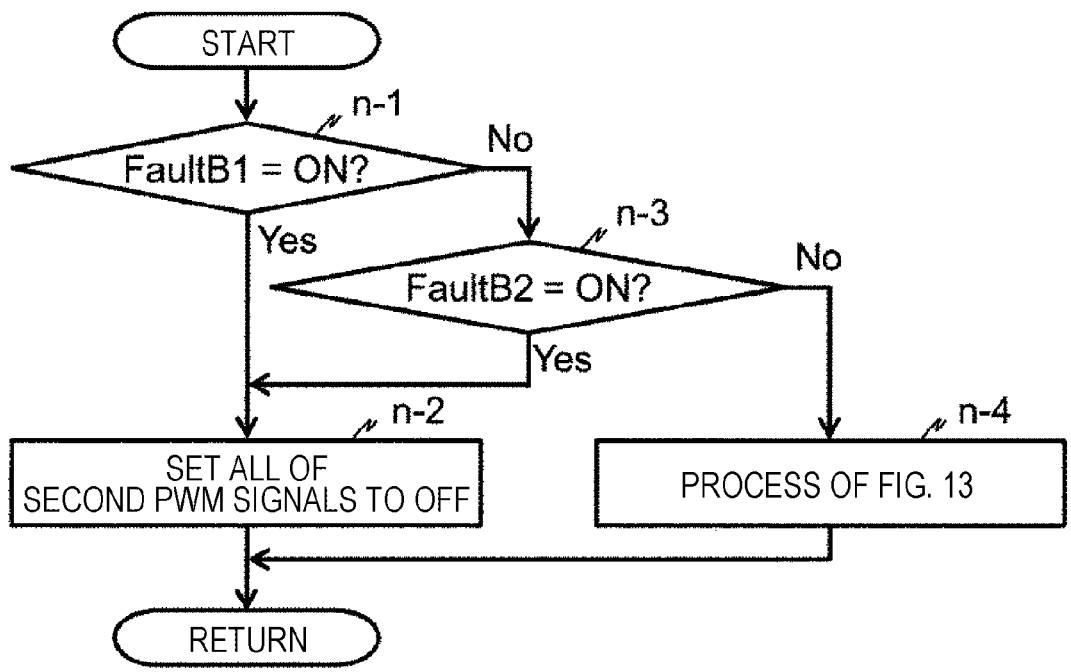
FIG. 20 is a diagram illustrating a processing sequence of the PWM modulator 380 according to the second embodiment.

FIG. 20 is a diagram illustrating a processing sequence of the PWM modulator 380 according to the second embodiment. The processing sequence of FIG. 20 is substantially similar to the processing sequence of FIG. 19, and it will not be described in details repeatedly.

Similarly to the PWM modulator 370, the PWM modulator 380 according to the second embodiment can stop switching (maintain OFF states) of the switching elements of the upper and lower arms of each phase of the second inverter 120 when the second ground fault determination flag FaultB1 is set to ON, or the second overcurrent determination flag FaultB2 is set to ON. Meanwhile, when both the second ground fault determination flag FaultB1 and the second overcurrent determination flag FaultB2 are set to OFF, an average value of the PWM voltage of the UVW-phase output from the second inverter 120 can be set to match the second three-phase AC voltage commands vuB*, vvB*, and vwB*.

This application claims priority based on Japanese Patent Application No. 2016-000328, filed in the Japan Patent Office on Jan. 5, 2016, the entire contents of which are incorporated herein by reference.

REFERENCE SIGNS LIST 10 battery
20 first inverter
30 to 80 switching element of first inverter
90, 95 shunt resistance
98 ground fault resistance
100, 105 amplifier
110 motor
120 second inverter
130 to 180 switching element of second inverter
190 angle detector for detecting magnetic pole position of rotor of motor
200 motor output shaft
210 gearbox
220 rod
230 torque sensor
240 steering
250 manual steering gear
260 tie rod
270 vehicle wheel
280 control device
285 detection current selector
290 carrier generator
295 abnormality detector
300 three-phase AC current calculator
310 abc-to-dq transformer
320 current controller
330 current command generator
340 voltage command predictor
350, 360 dq-to-abc transformer
370, 380 PWM modulator
390 gate drive circuit of first inverter
400 gate drive circuit of second inverter

The invention claimed is:

1. An inverter control device comprising:
at least first and second inverters;
a current detector that detects a current flowing through a main circuit of the first inverter;
a current controller that generates a voltage command value of the first inverter on the basis of a detected current and a current command; and
a voltage command predictor that generates a voltage command value of the second inverter on the basis of a variation of the voltage command value of the first inverter.

2. The inverter control device according to claim 1, wherein the current detector sequentially switchingly detects a current flowing through the main circuit of the first inverter and a current flowing through the main circuit of the second inverter,
the current controller generates the voltage command value of the first inverter on the basis of the detected current and a predetermined current command during a current detection period of the first inverter, and
the voltage command predictor generates the voltage command value of the second inverter during the current detection period of the first inverter by adding a variation of the voltage command value of the first inverter to the previous voltage command value of the second inverter.

3. The inverter control device according to claim 2, wherein the current controller generates a voltage command value of the second inverter on the basis of the detected current and a predetermined current command during a current detection period of the second inverter, and
the voltage command predictor generates the voltage command value of the first inverter during the current detection period of the second inverter by adding a variation of the voltage command value of the second inverter to the previous voltage command value of the first inverter.

4. The inverter control device according to claim 1, wherein the current detector detects a DC bus current flowing to a DC bus of the first inverter.

5. The inverter control device according to claim 1, wherein the current detector detects a current flowing between a lower or upper arm of each phase of the first inverter and a DC bus.

6. The inverter control device according to claim 1, wherein the current detector detects a current flowing to a three-phase AC output line of the first inverter.

7. The inverter control device according to claim 1, further comprising an abnormality detector that detects an abnormality in the first inverter on the basis of a current detected by the current detector.

8. The inverter control device according to claim 7, wherein the abnormality detector stops (turns off) switching of all of upper and lower arms of each phase of the first inverter in a case where a DC bus current of the first inverter detected when all of the lower arms of each phase of the first inverter are set to ON is larger than a predetermined threshold value.

9. The inverter control device according to claim 7, wherein the abnormality detector stops (turns off) switching of all of the upper and lower arms of each phase of the first inverter in a case where a three-phase AC current of the first inverter is larger than a predetermined threshold value.

10. A motor drive device comprising:
the inverter control device according to claim 1; and
a motor having
a first coil connected to the first inverter;
a second coil connected to the second inverter;
a stator where the first and second coils are wound.

11. An electric power steering apparatus mounted with the motor drive device according to claim 10.

* * * * *